United States Patent
Kurihara et al.

(10) Patent No.: US 8,014,242 B2
(45) Date of Patent: Sep. 6, 2011

(54) LASER DRIVING CIRCUIT, ITS RECORDING COMPENSATION METHOD AND OPTICAL-DISK APPARATUS

(75) Inventors: Tsutomu Kurihara, Kanagawa (JP); Katsunori Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 12/403,692

(22) Filed: Mar. 13, 2009

(65) Prior Publication Data

US 2009/0245076 A1    Oct. 1, 2009

(30) Foreign Application Priority Data

Mar. 31, 2008   (JP) ................................. 2008-092815

(51) Int. Cl.
*G11B 7/00* (2006.01)

(52) U.S. Cl. .................. 369/47.5; 369/47.28; 369/116; 369/121; 369/124.14; 369/59.12

(58) Field of Classification Search .............. 369/59.11, 369/59.12, 47.5, 47.28, 116, 121, 124.14

See application file for complete search history.

(56) References Cited

U.S. PATENT DOCUMENTS

| 6,381,660 | B1 * | 4/2002 | Ito ................................. 710/58 |
| 7,009,924 | B2 * | 3/2006 | Morishima ................ 369/47.53 |
| 7,227,822 | B2 * | 6/2007 | Nishimura et al. .......... 369/47.5 |
| 2004/0081053 | A1 * | 4/2004 | Kojima ..................... 369/59.11 |

FOREIGN PATENT DOCUMENTS

| JP | 2004-139678 | 5/2004 |
| JP | 2004-348848 | 12/2004 |
| JP | 2005-018843 | 1/2005 |
| JP | 3931133 | 3/2007 |

OTHER PUBLICATIONS

Japanese Office Action issued on Mar. 2, 2010, for corresponding JP 2008-092815.

* cited by examiner

*Primary Examiner* — Wayne R Young
*Assistant Examiner* — Linh T Nguyen
(74) *Attorney, Agent, or Firm* — K&L Gates LLP

(57) ABSTRACT

A laser driving circuit employing a recording compensation circuit configured to generate a light emission timing of a laser on the basis of recorded data and a recording clock signal which are supplied to the recording compensation circuit includes: a phase synchronization circuit; a skew determination circuit; and a data latching circuit.

9 Claims, 16 Drawing Sheets

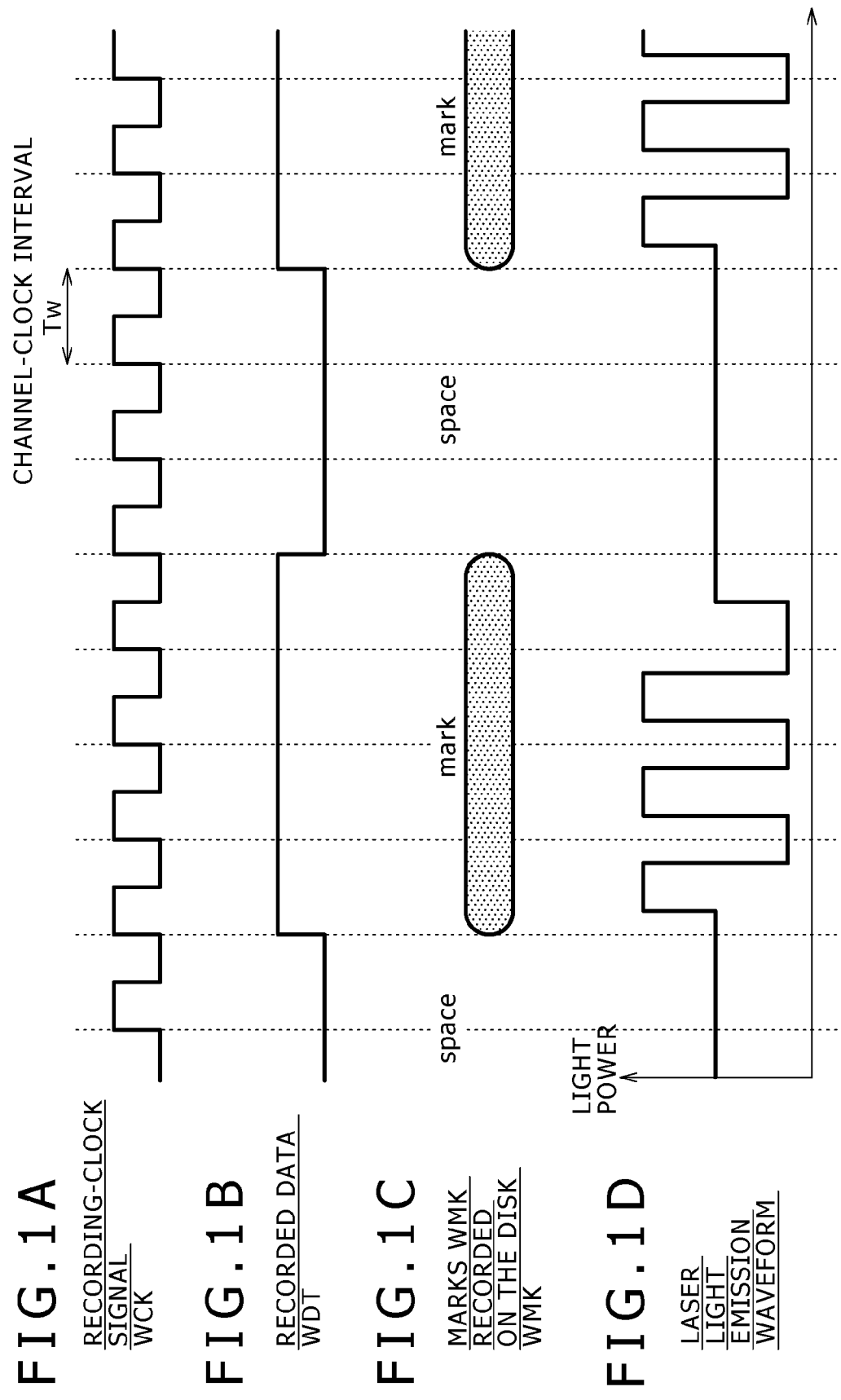

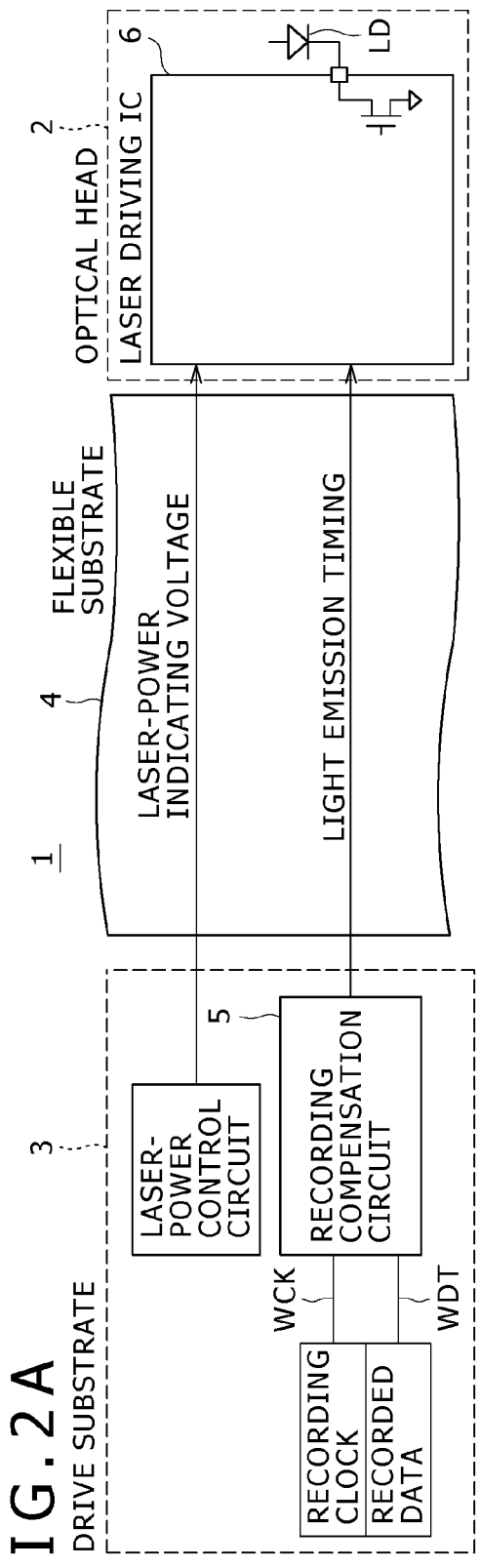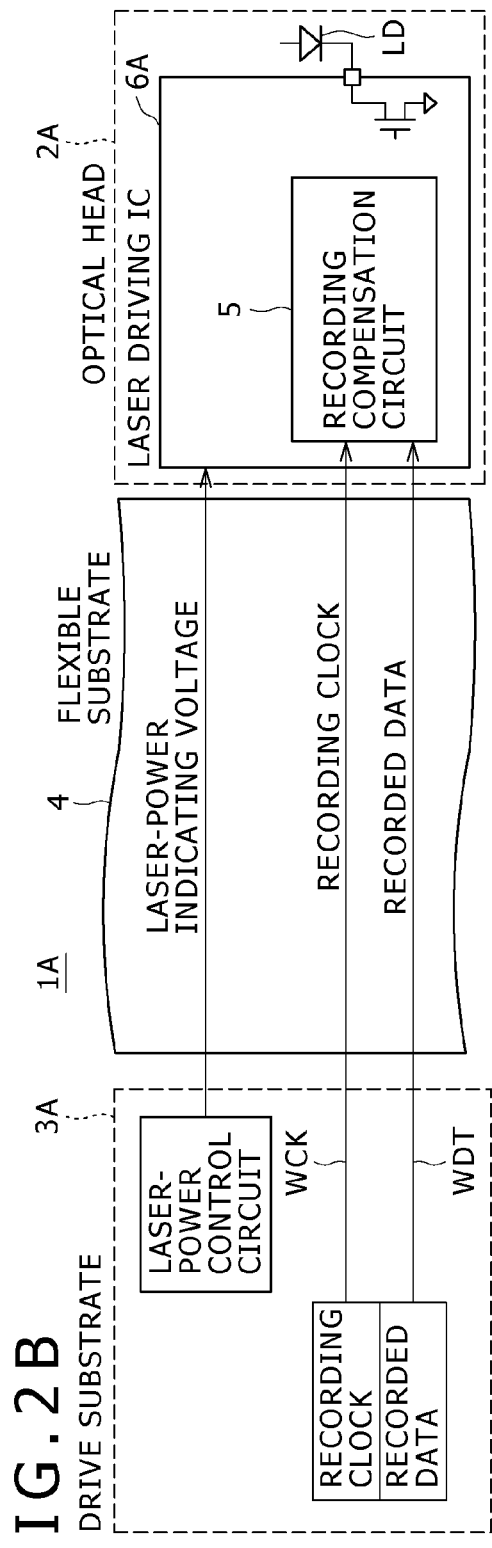

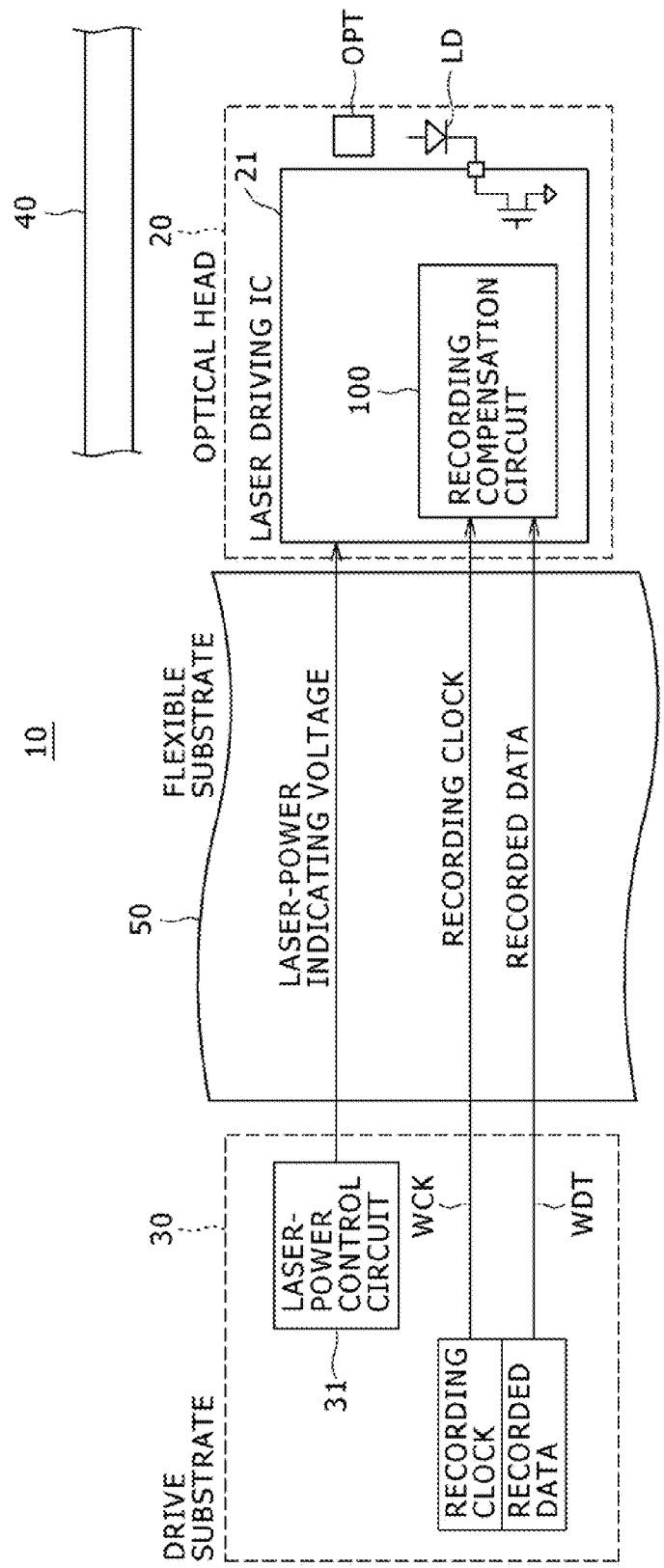

F I G . 6

| RESULTS OF LATCHING CLKS (CK0, CK2, CK4 AND CK6) WITH TIMING OF DATA | | | | OPTIMUM DATA-LATCHING CLK | NRZI PHASE |
|---|---|---|---|---|---|
| CK0 | CK2 | CK4 | CK6 | | |
| Hi | Low | Low | Hi | CK5 | ① |
| Hi | Hi | Low | Low | CK7 | ② |
| Low | Hi | Hi | Low | CK1 | ③ |
| Low | Low | Hi | Hi | CK3 | ④ |

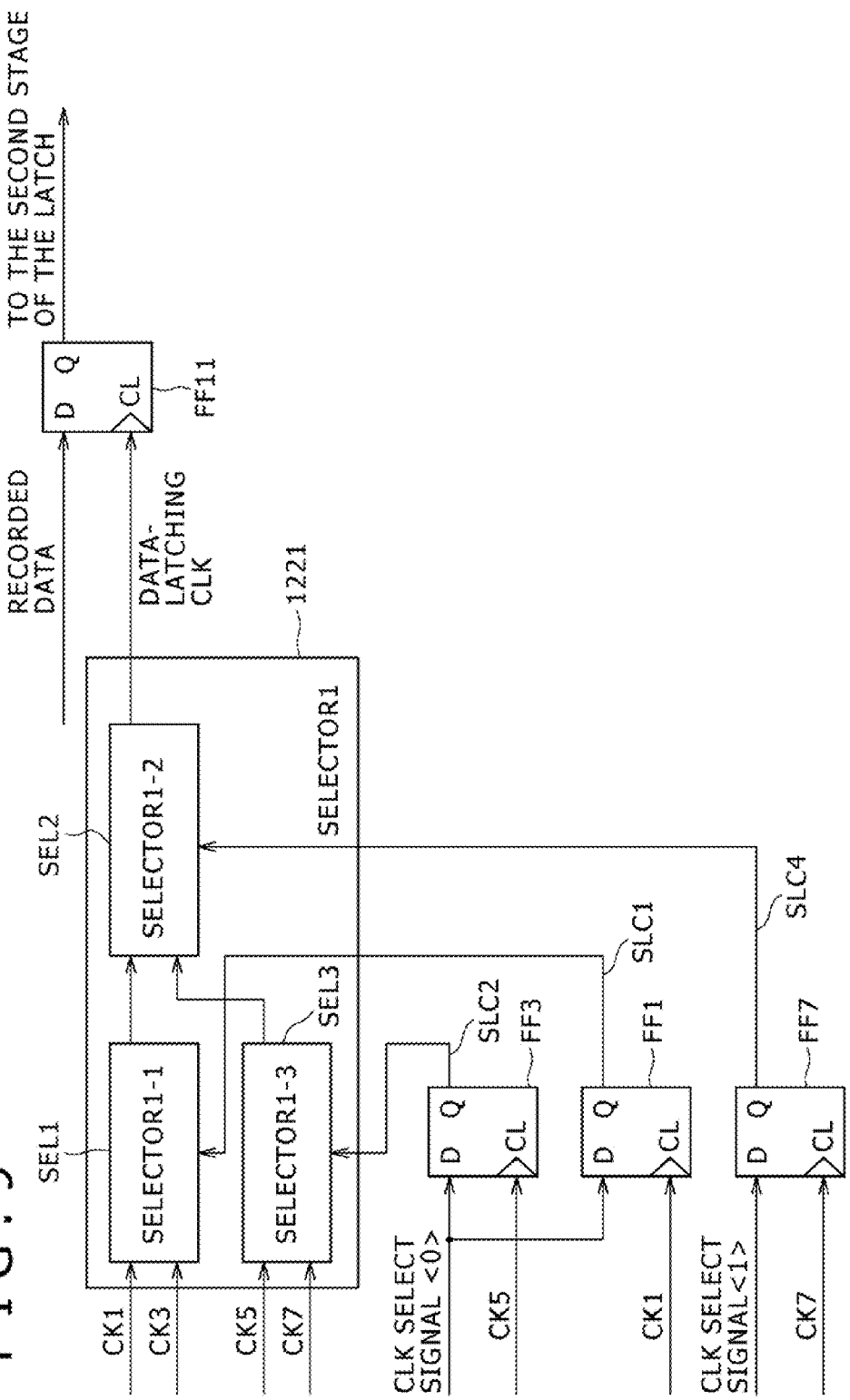

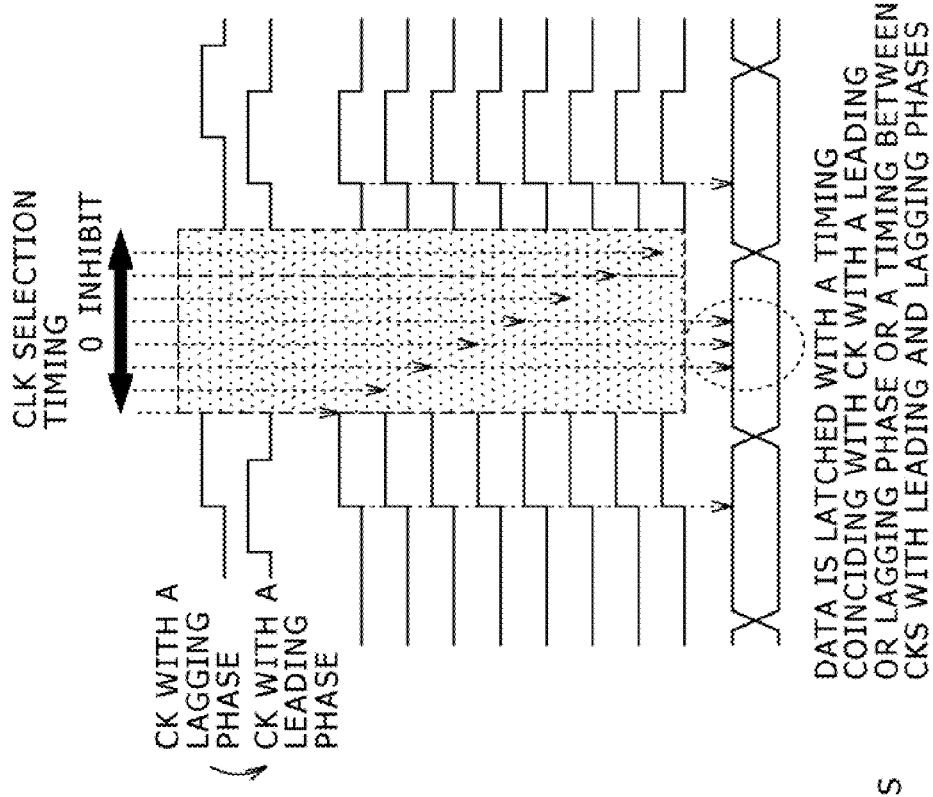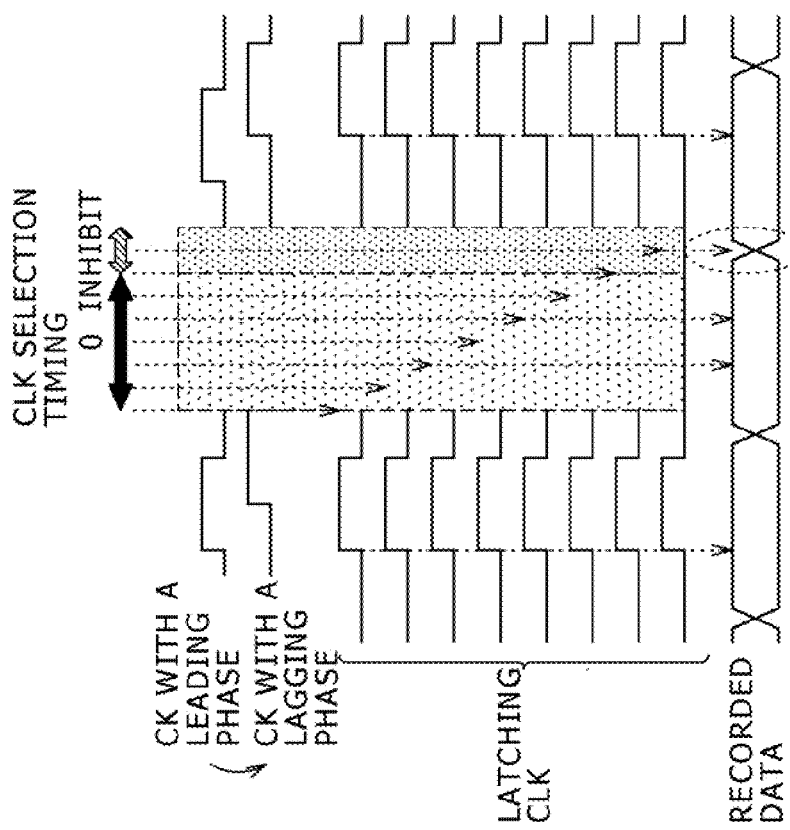

FIG.11

| | SELECT CLK TRANSITION | CLK SELECT SIGNAL | CLK SELECT SIGNAL LATCHING CLK |
|---|---|---|---|
| SELECTOR1-1 | CK3⇔CK1 | <0> | CK1 |
| SELECTOR1-2 | CK1⇔CK7 | <1> | CK7 |
| SELECTOR1-3 | CK7⇔CK5 | <0> | CK5 |
| SELECTOR2 | CK7⇔CK5 | <1> | CK5 |

LATCHED BY USING CK1 OR CK3

LATCHED WITH A TIMING
DIFFERENT FROM CK1 AND CK3

RECORDING CLOCKS

<1> SKEW = -2/4 T

RECORDED DATA
CK5
CK5
CK4
CK0

<2> SKEW = -1/4 T

RECORDED DATA
CK7
CK5
CK4
CK0

<3> SKEW = 1/4 T

RECORDED DATA
CK1
CK7
CK4
CK0

<4> SKEW = 2/4 T

RECORDED DATA
CK3
CK7
CK4
CK0

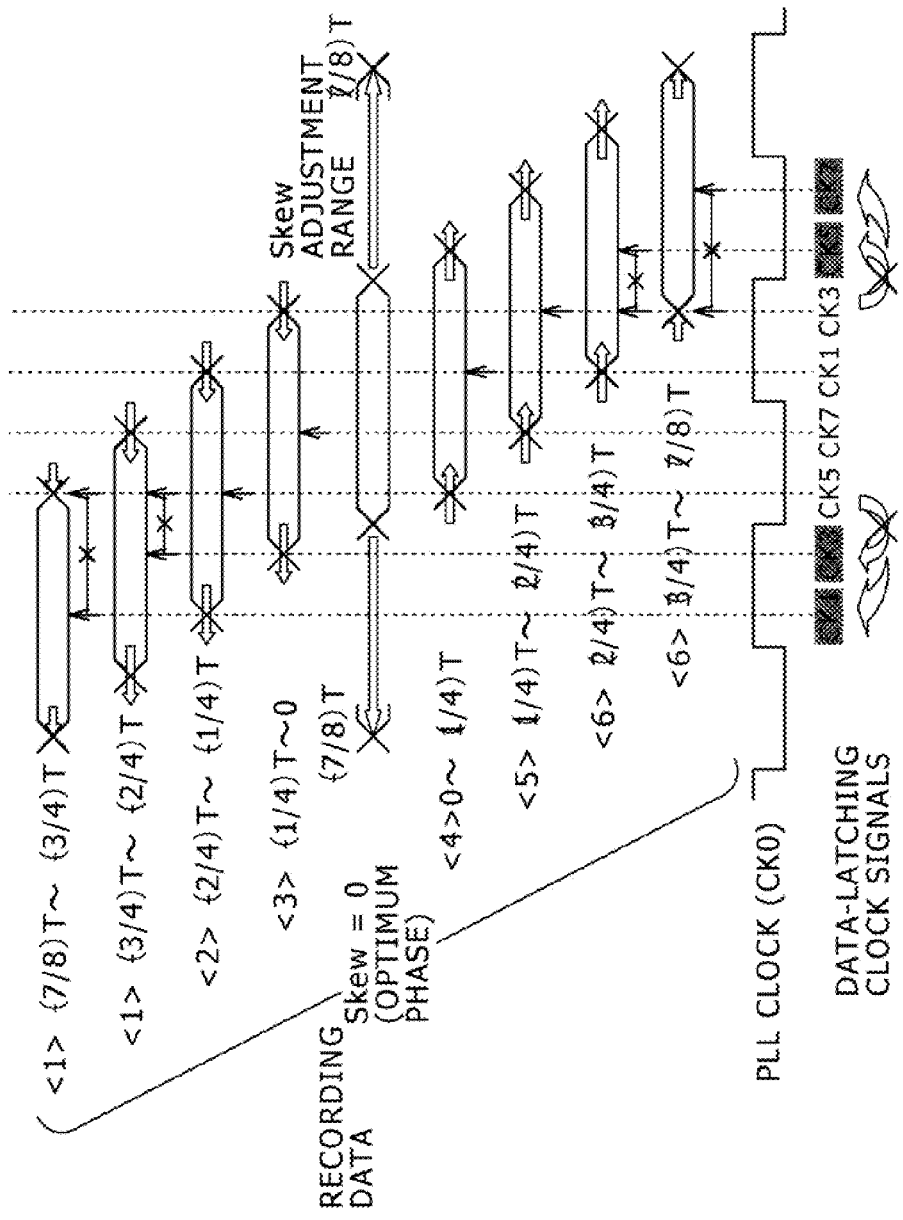

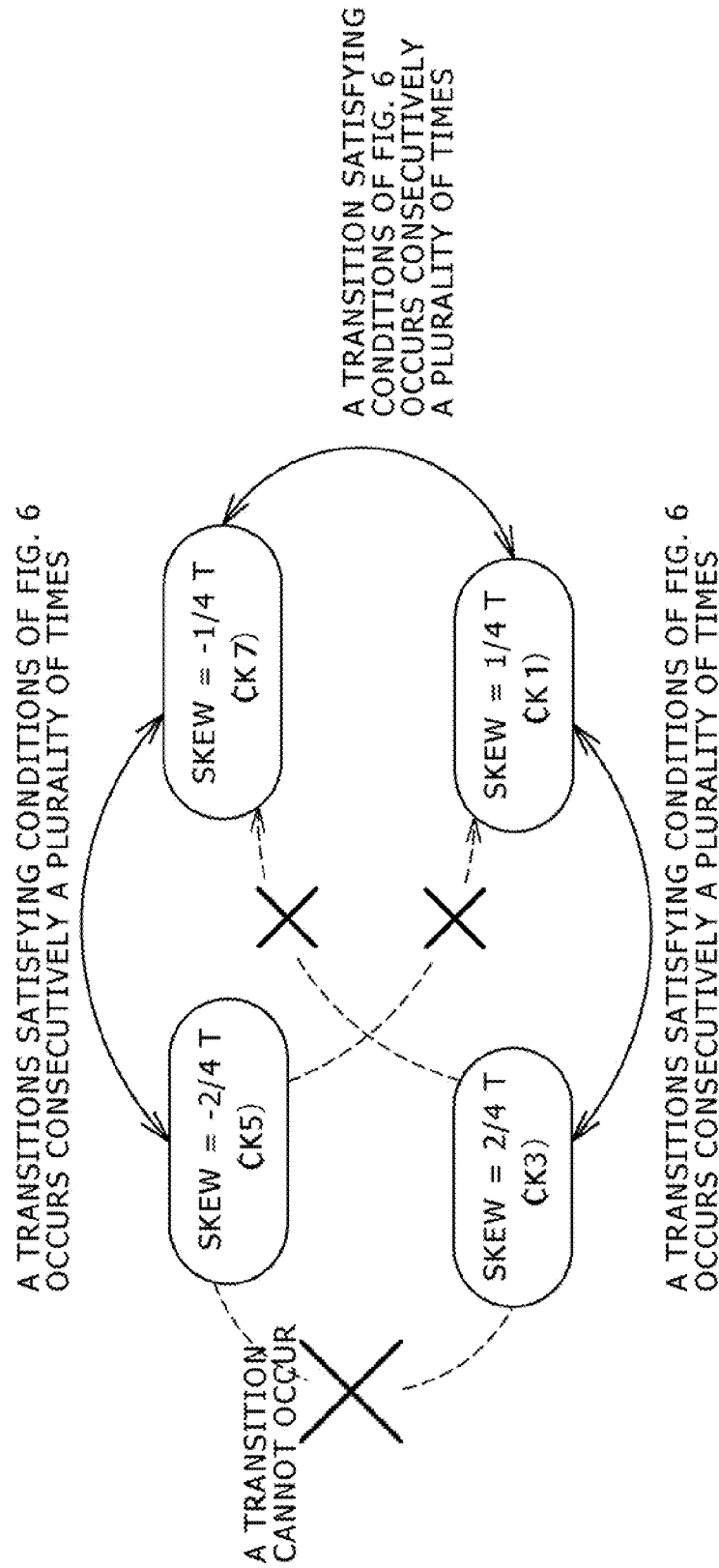

LASER DRIVING CIRCUIT, ITS RECORDING COMPENSATION METHOD AND OPTICAL-DISK APPARATUS

CROSS REFERENCES TO RELATED APPLICATIONS

The present application claims priority to Japanese Priority Patent Application JP 2008-092815 filed in the Japan Patent Office on Mar. 31, 2008, the entire contents of which are incorporated herein by reference.

BACKGROUND

The present application relates to a laser driving circuit employed in an optical-disk apparatus as a circuit provided with a recording compensation circuit and relates to the optical-disk apparatus for recording data onto an optical disk.

Each of FIGS. 1A to 1D is an explanatory diagram referred to in description of a general method for recording data WDT onto an optical disk. In this patent specification, the data WDT to be recorded onto an optical disk is referred to as recorded data WDT. To be more specific, FIG. 1A is an explanatory diagram showing the waveform of a recording clock signal WCK whereas FIG. 1B is an explanatory diagram showing the waveform of the recorded data WDT. FIG. 1C is an explanatory diagram showing recording marks WMK recorded on an optical disk whereas FIG. 1D is an explanatory diagram showing the waveform of light generated by a laser driven by the laser driving circuit cited above.

Data WDT is recorded onto most of optical disks by adoption of the so-called optical strength modulation method whereby marks WMK and spaces are formed on the optical disk in accordance with changes of the strength of the optical power (or light power) used in the process of recording the data.

In recording data WDT onto an optical disk in a recording process that generates only few errors, the changes of the optical power do not reflect changes of the recorded data WDT itself. Instead, the optical power has a waveform consisting of portions which each resemble a comb as shown in the explanatory diagram of FIG. 1D.

It is necessary to adjust the timing of each edge of the light emission pattern shown in the explanatory diagram of FIG. 1D by making an adjustment unit smaller than a channel clock interval Tw shown in the explanatory diagram of FIG. 1A. Typical examples of the adjustment unit are Tw/40, Tw/32 and Tw/16.

The devisal to create the light emission pattern like the one shown in the explanatory diagram of FIG. 1D is referred to as recording compensation whereas the timing of each edge of the light emission pattern is determined by a recording compensation circuit mentioned before in accordance with recorded data WDT like one shown in the explanatory diagram of FIG. 1B.

Each of FIGS. 2A and 2B is an explanatory diagram showing a typical configuration of a laser driving system, which includes the aforementioned laser driving circuit and the recording compensation circuit cited earlier, in an optical-disk apparatus.

The existing laser driving system 1 shown in the explanatory diagram of FIG. 2A as a system of an optical-disk apparatus employs an optical head 2 and a drive substrate 3. The optical head 2 is a component on which a semiconductor laser and optical components are mounted. On the other hand, the drive substrate 3 is a substrate on which control circuits are mounted.

In order to make the optical head 2 movable in the radial direction of the optical disk, the optical head 2 and the drive substrate 3 are connected to each other by making use of a flexible substrate 4.

In the existing laser driving system 1, a recording compensation circuit 5 is mounted on the drive substrate 3 as shown in the explanatory diagram of FIG. 2A. The recording compensation circuit 5 mounted on the drive substrate 3 supplies a signal indicating a light emission timing to an IC mounted on the optical head 2 to serve as a laser driving circuit 6 by way of the flexible substrate 4. On the other hand, a laser-power control circuit mounted on the drive substrate 3 applies a voltage indicating a laser power (the light or optical power mentioned before) to the laser driving circuit 6 through the flexible substrate 4. In accordance with the voltage indicating a laser power, the laser driving circuit 6 generates a driving current for driving a semiconductor laser LD to enter a state of emitting light.

The signal indicating a light-emission timing has timing information expressed in terms of units which are each smaller than the channel clock interval Tw shown in the explanatory diagram of FIG. 1A. With recording-speed improvements made in recent years, however, it became difficult to transmit the signal indicating a light emission timing to the laser driving circuit 6 by way of the flexible substrate 4.

In order to solve the problem described above, in the typical configuration of a solution laser driving system 1A shown in the diagram of FIG. 2B to serve as a solution to the problem, it is the laser driving circuit 6A that includes the embedded recording compensation circuit 5. Instead of supplying information on a light emission timing to the recording compensation circuit 5 by way of the flexible substrate 4, the drive substrate 3A outputs a recording clock signal WCK and the recorded data WDT to the recording compensation circuit 5 by way of the flexible substrate 4. Since each of the recording clock signal WCK and the recorded data WDT is a signal having granularities each equal to the channel clock interval Tw, the recording clock signal WCK and the recorded data WDT are both hardly affected by the transmission characteristic of the flexible substrate 4.

SUMMARY

Even in the case of the configuration of the typical solution laser driving system 1A in which the laser driving circuit 6A includes the embedded recording compensation circuit 5 as shown in the diagram of FIG. 2B and each of the recording clock signal WCK and the recorded data WDT is a signal having granularities each equal to the channel clock interval Tw, variations in phase between the recording clock signal WCK and the recorded data WDT are generated due to variations in circuit characteristics as well as variations in transmission characteristics.

As the variations in phase increase in magnitude and number, the recorded data WDT can no longer be latched correctly in the recording compensation circuit 5. Thus, there is a demand for a function to correct the variations in phase between recording clock signal WCK and the recorded data WDT.

An optical-disk apparatus and a phase adjustment method for the apparatus are disclosed in Japanese Patent No. 3,931,133 (hereinafter referred to as Patent Document 1) to serve as an apparatus and a method which are provided by making use of a technology for correcting the variations in phase. According to the technology disclosed in Patent Document 1, a difference in phase between the recorded data WDT and the recording clock signal WCK is detected by making use of a counter driven by a clock signal having a frequency higher than the frequency of the channel clock signal, and a delay quantity for the recorded data WDT or the recording clock signal WCK is adjusted in accordance with the detected difference in phase in order to correct the difference.

In accordance with the phase adjustment method disclosed in Patent Document 1, however, the optical-disk apparatus demands the counter driven by a clock signal having a frequency higher than the frequency of the channel clock signal and a delay circuit for adjusting the delay quantity. Thus, the phase adjustment method has a demerit of a complicated configuration.

In order to solve the problems described above, it is desirable to provide a laser driving circuit capable of latching data in a recording compensation circuit of the laser driving circuit without generating an error even if there is a difference in phase between the recorded data and a recording clock signal without entailing a complicated configuration and desirable to provide an optical-disk apparatus employing the laser driving circuit.

A laser driving circuit provided in accordance with a first embodiment employs a recording compensation circuit for generating a light emission timing of a laser on the basis of recorded data and a recording clock signal which are supplied to the recording compensation circuit. The recording compensation circuit includes: a phase synchronization circuit for generating a plurality of clock signals having phases different from each other to serve as clock signals synchronized with the recording clock signal supplied to the phase synchronization circuit; and a skew determination circuit for latching some of the clock signals, which are generated by the phase synchronization circuit as clock signals having phases different from each other, with a timing according to the recorded data supplied to the skew determination circuit and for determining a phase optimum for an operation to latch the recorded data on the basis of a combination of the values of the latched clock signals. The recording compensation circuit further includes a data latching circuit for latching the recorded data supplied to the data latching circuit by making use of a clock signal having a phase conforming to a result of determination carried out by the skew determination circuit.

The data latching circuit selects a clock signal with a phase having a timing margin with respect to the phase of the recorded data supplied to the data latching circuit to serve as the clock signal which is used for latching the recorded data.

It is desirable to provide a configuration in which the skew determination circuit has a consecutive-times consistency determination circuit for carrying out a process of verifying that the same value has been consecutively obtained a plurality of times in a row as a result of an operation to latch each of the clock signals, which are generated by the phase synchronization circuit as clock signals having phases different from each other, with a timing according to the recorded data supplied to the skew determination circuit.

It is also desirable to provide a configuration in which the skew determination circuit has a clock selection timing adjustment circuit for changing a data latching clock signal used for latching recorded data with a timing not in a period between the falling edge of a pulse of a clock signal having a leading phase and the rising edge of a pulse of a clock signal having a lagging phase in an operation to change the data latching clock signal used for latching recorded data from the clock signal having a leading phase to the clock signal having a lagging phase.

It is also desirable to provide a configuration in which, after the data latching circuit latches the recorded data supplied to the data latching circuit by making use of a clock signal with a phase having a timing margin with respect to the phase of the recorded data, the data latching circuit again latches the recorded data with a timing synchronized to the recording clock signal supplied to the phase synchronization circuit.

It is also desirable to provide a configuration in which: the skew determination circuit is provided with a function for determining a skew of the recorded data with respect to the recording clock signal supplied to the phase synchronization circuit from a phase determined by the skew determination circuit to be the phase optimum for an operation to latch the recorded data; and if the function determines that the skew exceeds ±1/2 T, the skew determination circuit holds an optimum data latching phase immediately preceding detection of the skew, which exceeds ±1/2 T, to be used as a phase optimum for an operation to latch the recorded data.

A recording compensation method provided in accordance with a second embodiment to serve as a recording compensation method for a laser driving circuit for generating a light emission timing of a laser on the basis of a recorded data and a recording clock signal which are supplied to the laser driving circuit. The recording compensation method includes: a phase synchronization step of generating a plurality of clock signals having phases different from each other to serve as clock signals synchronized with the recording clock signal supplied to the laser driving circuit; and a skew determination step of latching the clock signals, which are generated at the phase synchronization step as clock signals having phases different from each other, with a timing according to the recorded data supplied to the laser driving circuit and determining a phase optimum for an operation to latch the recorded data on the basis of a combination of the values of the latched clock signals. The recording compensation method further includes: a data latching step of latching the recorded data supplied to the laser driving circuit by making use of a clock signal having a phase conforming to a result of determination carried out at the skew determination step.

The data latching step is executed in order to select a clock signal with a phase having a timing margin with respect to the phase of the recorded data supplied to the laser driving circuit to serve as the clock signal which is used for latching the recorded data.

An optical-disk apparatus for recording recorded data onto an optical disk medium by making use of a laser in accordance with a third embodiment. The optical-disk apparatus has a laser driving circuit for driving the laser and employs a recording compensation circuit for generating a light emission timing of the laser on the basis of recorded data and a recording clock signal which are supplied to the recording compensation circuit. The recording compensation circuit includes: a phase synchronization circuit for generating a plurality of clock signals having phases different from each other to serve as clock signals synchronized with the recording clock signal supplied to the phase synchronization circuit; and a skew determination circuit for latching some of the clock signals, which are generated by the phase synchronization circuit as clock signals having phases different from each other, with a timing according to the recorded data supplied to the skew determination circuit and for determining a phase optimum for an operation to latch the recorded data on the basis of a combination of the values of the latched clock signals. The recording compensation circuit further includes: a data latching circuit for latching the recorded data supplied to the data latching circuit by making use of a clock signal having a phase conforming to a result of determination carried out by the skew determination circuit.

The data latching circuit selects a clock signal with a phase having a timing margin with respect to the phase of the recorded data supplied to the data latching circuit to serve as the clock signal which is used for latching the recorded data.

In accordance with the present embodiment, the phase synchronization circuit generates a plurality of clock signals having phases different from each other to serve as clock signals synchronized with the recording clock signal supplied to the phase synchronization circuit and supplies the clock signals to the skew determination circuit and the data latching circuit.

The skew determination circuit latches the clock signals, which are generated by the phase synchronization circuit as clock signals having phases different from each other, with a timing according to the recorded data supplied to the skew determination circuit. In addition, the skew determination circuit determines a phase optimum for an operation to latch the recorded data on the basis of a combination of the values of the latched clock signals.

Then, the data latching circuit lathes the recorded data supplied to the data latching circuit by making use of the clock signal having a phase conforming to a result of determination carried out by the skew determination circuit. The data latching circuit selects a clock signal with a phase having a timing margin with respect to the phase of the recorded data to serve as a clock signal which is used for latching the recorded data.

In accordance with the present embodiment, it is possible to latch recorded data without generating an error even if there is a difference in phase between the recorded data and the recording clock signal without entailing a complicated configuration.

Additional features and advantages are described herein, and will be apparent from the following Detailed Description and the figures.

BRIEF DESCRIPTION OF THE FIGURES

FIGS. 1A to 1D are explanatory diagrams to be referred to in description of a general method for recording data WDT onto an optical disk;

FIGS. 2A and 2B are explanatory diagrams each showing a typical configuration of a laser driving system in an optical-disk apparatus provided with a recording compensation circuit;

FIG. 3 is a block diagram showing a model configuration of main components composing an optical-disk apparatus according to an embodiment;

FIG. 6 is a diagram showing a table to be referred to in description of typical operations carried out by a data latching phase determination circuit included in a skew determination circuit employed in the data latching section shown in the block diagram of FIG. 5 to determine a clock signal having a phase optimum for an operation to latch recorded data;

FIG. 9 is a diagram showing clock selection paths of selector;

FIGS. 10A and 10B are timing diagrams each showing timing charts of an operation to select a clock signal with a phase optimum for an operation to latch recorded data;

FIG. 11 is an explanatory diagram showing a table to be referred to in describing adjustment of timings of clock select signals;

FIGS. 15A to 15D are explanatory diagrams to be referred to in description of enlargement of a skew adjustment range; and FIG. 16 is a diagram showing transitions of the state of the data latching phase determination circuit.

DETAILED DESCRIPTION

Figure 4:
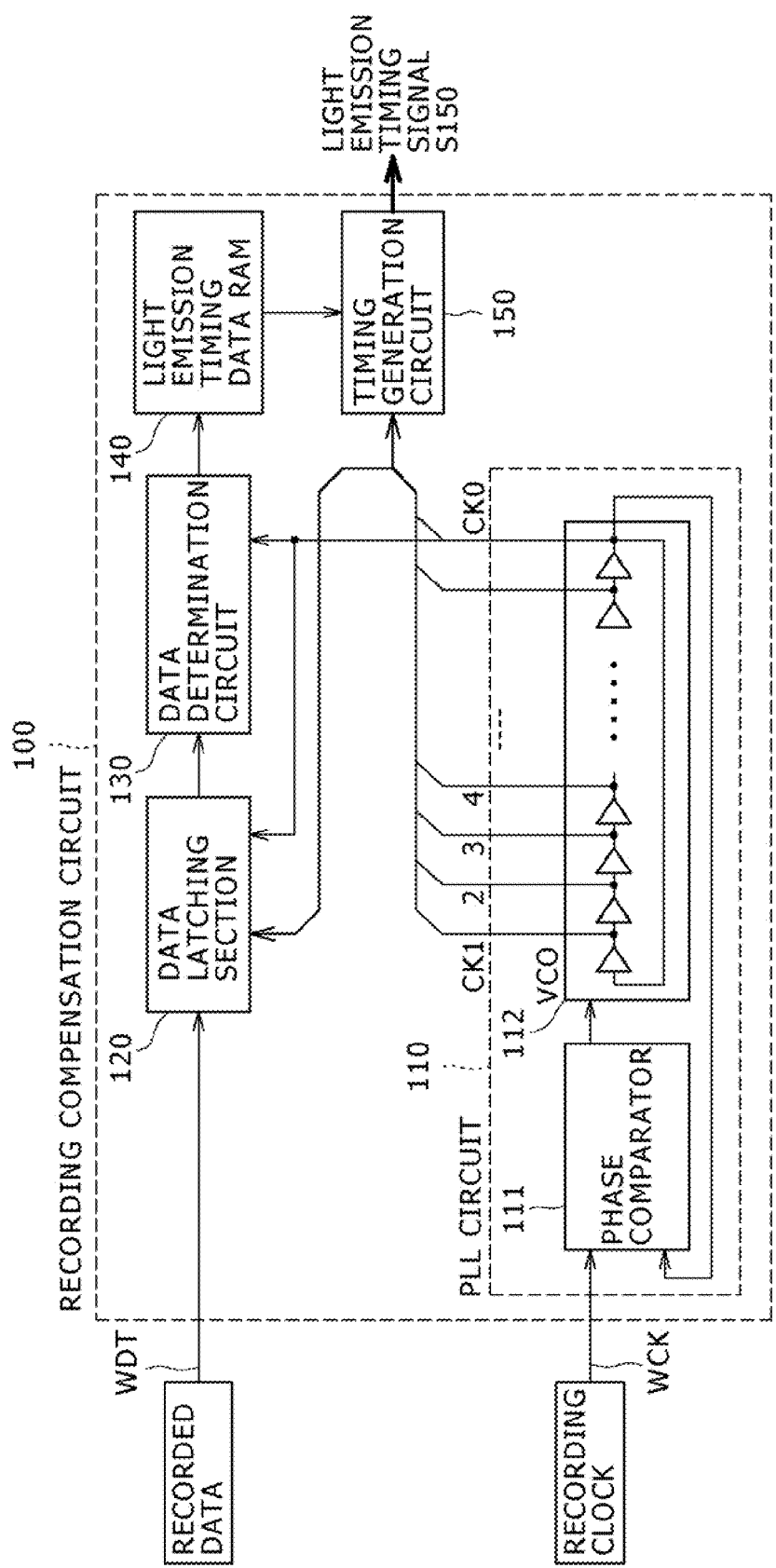
FIG. 4 is a block diagram showing a typical configuration of a recording compensation circuit embedded in a laser driving IC employed in the optical-disk apparatus shown in the block diagram of FIG. 3.

A preferred embodiment is explained by referring to diagrams as follows.

FIG. 3 is a block diagram showing a model configuration of main components composing an optical-disk apparatus 10 according to an embodiment. The block diagram of FIG. 3 shows the configuration by focusing on a laser driving system of the optical-disk apparatus 10. That is to say, the block diagram does not show sections such as an optical system and a servo system.

The optical-disk apparatus 10 employs an optical head 20 and a drive substrate 30. The optical head 20 is a section on which a semiconductor laser LD, an optical component OPT and a laser driving circuit 21 (or a laser driving IC (integrated circuit) 21) are mounted. On the other hand, the drive substrate 30 is a substrate on which a laser-power control circuit 31 is mounted.

In order to make the optical head 20 movable in the radial direction of the optical disk, the optical head 20 and the drive substrate 30 are connected to each other by making use of a flexible substrate 50.

The drive substrate 30 transmits a voltage indicating a laser power as well as a recording clock signal WCK and a recorded data WDT to the laser driving IC 21 mounted on the optical head 20. The drive substrate 30 transmits the recording clock signal WCK and the recorded data WDT to the laser driving IC 21 in place of a signal indicating a light emission timing. Receiving the voltage indicating a laser power, the recording clock signal WCK and the recorded data WDT from the drive substrate 30, the laser driving IC 21 generates a driving current in order to drive the semiconductor laser LD to emit light for recording data onto the optical disk.

The recording compensation circuit 100 is embedded in the laser driving IC 21.

A recording compensation circuit 100 embedded in the laser driving IC 21 demands neither delay circuit nor counter operating at a frequency higher than the frequency of the channel clock signal. Thus, it is possible to provide a configuration in which recorded data WDT can latched without generating an error even if there is a difference in phase between the recorded data WDT and the recording clock signal WCK without entailing a complicated configuration, phase differences in the range ±1 T can be tolerated and generation of a data error can be avoided without changing the phase of the emission of light from the laser even if a phase difference between the recorded data WDT and the recording clock signal WCK is detected in the range during an operation.

The following description explains details of the concrete configuration of the recording compensation circuit 100 embedded in the laser driving IC 21 and functions of the recording compensation circuit 100.

FIG. 4 is a block diagram showing a typical configuration of the recording compensation circuit 100 embedded in the laser driving IC 21 according to the embodiment.

As shown in the block diagram of FIG. 4, the recording compensation circuit 100 employs a PLL circuit 110 also referred to as a phase synchronization circuit, a data latching section 120, a data determination circuit 130, a light emission timing data RAM 140 and a timing generation circuit 150.

The PLL circuit 110 is a component for generating a plurality of clock signals CK0 to CKn with phases different from each other to serve as clock signals synchronized with a recording clock signal WCK supplied to the PLL circuit 110 and supplying the clock signals CK0 to CKn to the data latching section 120, the data determination circuit 130 and the timing generation circuit 150.

The PLL circuit 110 is configured to employ a phase comparator 111 and a voltage-controlled oscillator (VCO) 112. The phase comparator 111 is a component for comparing the phase of the recording clock signal WCK supplied to the PLL circuit 110 with the phase of the clock signal CK0. On the other hand, the VCO 112 is a component for generating the clock signals CK0 to CKn with phases different from each other to serve as clock signals synchronized with the recording clock signal WCK.

It is to be noted that other components employed in the PLL circuit 110 are not shown in the block diagram of FIG. 4. The other components include a charge pump.

Figure 5:
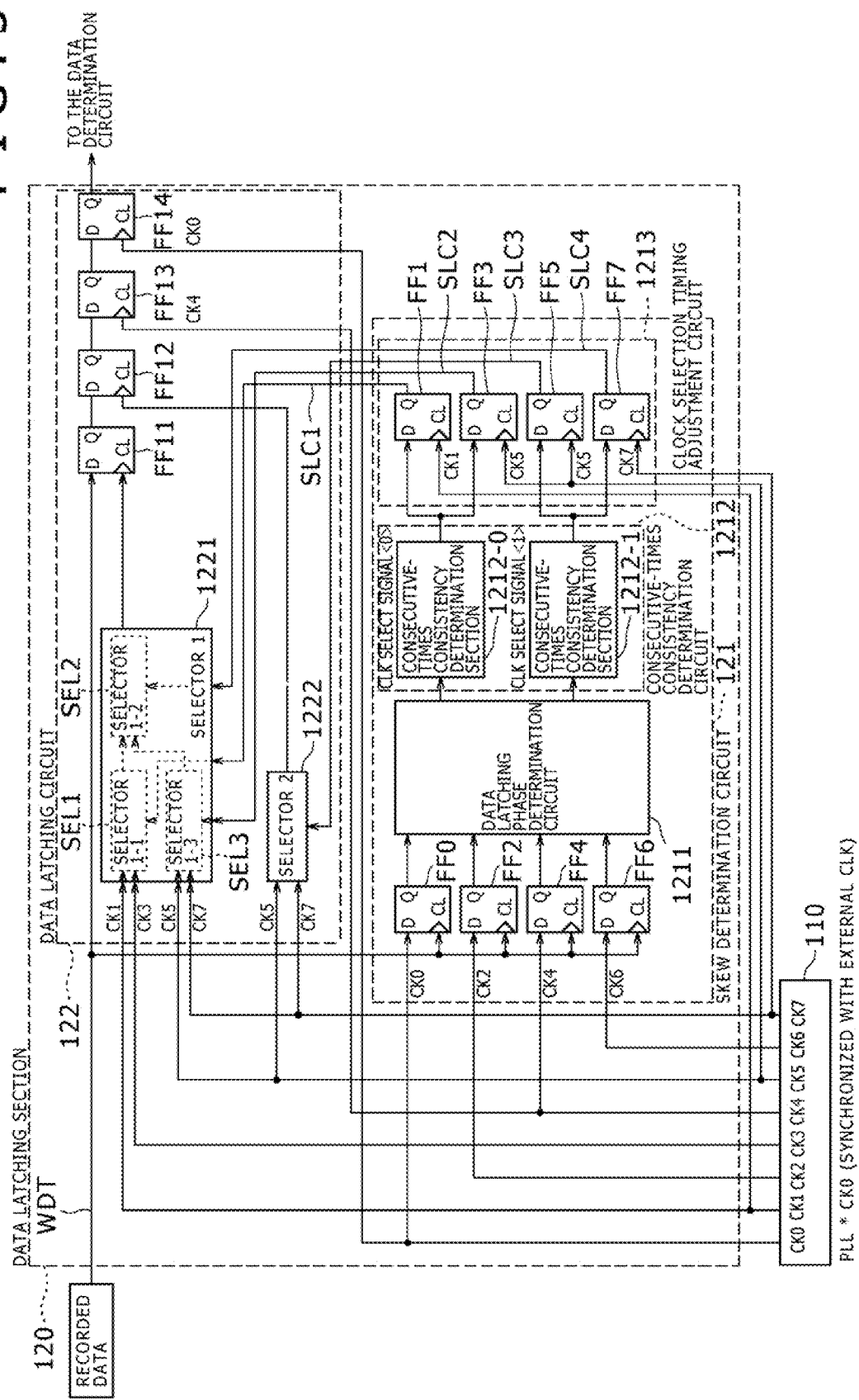
FIG. 5 is the circuit diagram showing a typical concrete configuration of a data latching section employed in the recording compensation circuit shown in the block diagram of FIG. 4.

As shown in a circuit diagram of FIG. 5, the data latching section 120 employs a skew determination circuit 121 and a data latching circuit 122. The skew determination circuit 121 is a circuit for latching some of the clock signals CK0 to CKn, which are generated by the PLL circuit 110 to serve as clock signals with phases different from each other, with a timing according to the recorded data WDT supplied to the data latching section 120 and for determining a phase optimum for an operation to latch the recorded data WDT on the basis of a combination of the values of the latched clock signals CK. On the other hand, the data latching circuit 122 is a circuit for latching the recorded data WDT by making use of a clock signal CK having a phase conforming to a result of determination carried out by the skew determination circuit 121. The data latching circuit 122 selects a clock signal CK with a phase having a timing margin with respect to the phase of the recorded data WDT to serve as a clock signal CK which is used for latching the recorded data WDT.

The skew determination circuit 121 and the data latching circuit 122, which are employed in the data latching section 120, will be described later in detail.

In the recording compensation circuit 100 shown in the block diagram of FIG. 4, in synchronization with the clock signal CK0 generated by the PLL circuit 110, the data determination circuit 130 determines the mark and space lengths of the recorded data WDT latched by the data latching section 120, supplying the mark and space lengths obtained as a result of the determination to the light emission timing data RAM 140.

The light emission timing data RAM 140 is a memory used for storing information on light emission timings as information associated with the mark and space lengths received from the data determination circuit 130. The timing generation circuit 150 reads out the information on light emission timings as information associated with the mark and space lengths from the light emission timing data RAM 140.

The timing generation circuit 150 also receives the clock signals CK0 to CKn generated by the PLL circuit 110 to serve as clock signals with phases different from each other. The timing generation circuit 150 selects a demanded timing on the basis of information read out from the light emission timing data RAM 140 to serve as the information on light emission timings, generating a light emission timing signal S150 which represents the demanded timing.

The following description explains the concrete configuration of the data latching section 120 employed in the recording compensation circuit 100 shown in the block diagram of FIG. 4 and functions of the data latching section 120.

FIG. 5 is the circuit diagram showing a typical concrete configuration of the data latching section 120 employed in the recording compensation circuit 100 shown in the block diagram of FIG. 4.

It is to be noted that the typical concrete configuration of the data latching section 120 shown in the circuit diagram of FIG. 5 makes use of typically 8 clock signals CK0 to CK7 in an operation to latch the recorded data WDT.

As shown in the circuit diagram of FIG. 5, the PLL circuit 110 generates the 8 clock signals CK0 to CK7 with phases different from each other and supplies the 8 clock signals CK0 to CK7 to the data latching section 120. The clock signal CK0 has the same phase as the recording clock signal WCK supplied to the PLL circuit 110.

The data latching section 120 has a skew determination circuit 121 and a data latching circuit 122.

The skew determination circuit 121 employs flip-flops FF0, FF2, FF4 and FF6, a data latching phase determination circuit 1211, a consecutive-times consistency determination circuit 1212 as well as a clock selection timing adjustment circuit 1213. In this typical configuration of the skew determination circuit 121, the flip-flops FF0, FF2, FF4 and FF6 are used for latching respectively the clock signals CK0, CK2, CK4 and CK6, with a timing according to the recorded data WDT supplied to the data latching section 120. The data latching phase determination circuit 1211 is a component for determining a clock signal CK having a phase optimum for an operation to latch the recorded data WDT on the basis of a combination of the values of the clock signals CK0, CK2, CK4 and CK6 which have been latched in the flip-flops FF0, FF2, FF4 and FF6 respectively. The consecutive-times consistency determination circuit 1212 is a circuit for carrying out a process of verifying that the same value has been consecutively obtained a plurality of times in a row as a result of an operation to latch each of the clock signals CK0, CK2, CK4 and CK6, which are generated by the phase synchronization circuit 110 as clock signals having phases different from each other, in the flip-flop FF0, FF2, FF4 or FF6 respectively with a timing according to the recorded data WDT. The consecutive-times consistency determination circuit 1212 outputs clock (CLK) select signals <0> and <1> obtained as a result of the verification process to the clock selection timing adjustment circuit 1213. The clock selection timing adjustment circuit 1213 is a circuit for receiving the clock select signals <0> and <1> from the consecutive-times consistency determination circuit 1212 and for changing a clock signal CK having a phase optimum for an operation to latch recorded data WDT in accordance with the receiving clock select signals <0> and <1> with a timing not in a period between the falling edge of a pulse of a clock signal CK having a leading phase and the rising edge of a pulse of a clock signal CK having a lagging phase in an operation to change the clock signal CK having a phase optimum for an operation to latch recorded data WDT from the clock signal CK having a leading phase to the clock signal CK having a lagging phase. The clock selection timing adjustment circuit 1213 generates clock selection timing adjustment signals SLC1 to SLC4 as a result of changing the clock signal CK having a phase optimum for an operation to latch recorded data WDT from the clock signal CK having a leading phase to the clock signal CK having a lagging phase.

The skew determination circuit 121 is provided with a function for determining a skew of the recorded data WDT with respect to the supplied recording clock signal WCK from the phase optimum for an operation to latch the recorded data WDT, that is, from the phase of a clock signal CK determined by the data latching phase determination circuit 1211. If the function determines that a skew exceeds ±1/2 T, the skew determination circuit 121 holds an optimum data latching phase immediately preceding detection of the skew, which exceeds ±1/2 T, to be used as a phase optimum for an operation to latch the recorded data.

The consecutive-times consistency determination circuit 1212 is configured to include a consecutive-times consistency determination section 1212-0 and a consecutive-times consistency determination section 1212-1. The consecutive-times consistency determination section 1212-0 is a component for carrying out a process of verifying that a value has been consecutively obtained a plurality of times in a row as a result of an operation to latch each of the clock signals CK, which are generated by the phase synchronization circuit as clock signals CK having phases different from each other, with a timing according to the recorded data and outputting the CLK select signal <0>. By the same token, the consecutive-times consistency determination section 1212-1 is a component for carrying out a process of verifying that a value has been consecutively obtained a plurality of times in a row as a result of an operation to latch each of the clock signals CK, which are generated by the phase synchronization circuit as clock signals CK having phases different from each other, with a timing according to the recorded data and outputting the CLK select signal <1>.

It is to be noted that, at the initial time only, the consecutive-times consistency determination circuit 1212 carries out a process of computing an average instead of carrying out the verification processes described above.

The clock selection timing adjustment circuit 1213 includes flip-flops FF1, FF3, FF5 and FF7. The flip-flop FF1, FF3, FF5 and FF7 are flip-flops used for latching the CLK select signal <0> received from the consecutive-times consistency determination circuit 1212 with a timing according to the clock signals CK1, CK5 and CK7 received from the PLL circuit 110 and for generating clock selection timing adjustment signals SLC1 to SLC4 to be output to the data fetching circuit 122.

To put it in more detail, the flip-flop FF1 is a flip-flop used for latching the CLK select signal <0> received from the consecutive-times consistency determination section 1212-0 with a timing synchronized to the clock signal CK1 received from the PLL circuit 110, for generating a clock selection timing adjustment signal SLC1 and for outputting the clock selection timing adjustment signal SLC1 to the data latching circuit 122.

By the same token, the flip-flop FF3 is a flip-flop used for latching the CLK select signal <0> received from the consecutive-times consistency determination section 1212-0 with a timing synchronized to the clock signal CK5 received from the PLL circuit 110, for generating a clock selection timing adjustment signal SLC2 and for outputting the clock selection timing adjustment signal SLC2 to the data latching circuit 122.

In the same way, the flip-flop FF5 is a flip-flop used for latching the CLK select signal <1> received from the consecutive-times consistency determination section 1212-1 with a timing synchronized to the clock signal CK5 received from the PLL circuit 110, for generating a clock selection timing adjustment signal SLC3 and for outputting the clock selection timing adjustment signal SLC3 to the data latching circuit 122.

Likewise, the flip-flop FF7 is a flip-flop used for latching the CLK select signal <1> received from the consecutive-times consistency determination section 1212-1 with a timing synchronized to the clock signal CK7 received from the PLL circuit 110, for generating a clock selection timing adjustment signal SLC4 and for outputting the clock selection timing adjustment signal SLC4 to the data latching circuit 122.

The data latching circuit 122 is provided with a function to again latch recorded data WDT supplied to the data latching circuit 122 with a timing according to the clock signal CK0 synchronized with the recording clock signal WCK supplied to the PLL circuit 110 after latching the recorded data WDT by making use of a clock signal CK with a phase having a timing margin with respect to the phase of the recorded data WDT as will be described later in detail.

The data latching circuit 122 employs a first selector section 1221, a second selector section 1222 as well as flip-flops FF11, FF12, FF13 and FF14. The flip-flops FF11, FF12, FF13 and FF14 are connected in series to form a 4-stage latch.

The first selector section 1221 is a component for selecting one of the clock signals CK1, CK3, CK5 and CK7 as a clock signal CK with a phase having a timing margin with respect to the phase of the recorded data WDT supplied to the data latching section 120 in accordance with the clock selection timing adjustment signals SLC1, SLC2 and SLC4 received from the clock selection timing adjustment circuit 1213 employed in the skew determination circuit 121 and supplying the selected one of the clock signals CK1, CK3, CK5 and CK7 to the flip-flop FF11.

The first selector section 1221 employs a first selector SEL1, a second selector SEL2 and a third selector SEL3.

The first selector SEL1 is a selector for selecting the clock signal CK1 or CK3 in accordance with the clock selection timing adjustment signal SLC1 received from the clock selection timing adjustment circuit 1213 employed in the skew determination circuit 121 and supplying the selected one of the clock signals CK1 and CK3 to the second selector SEL2.

By the same token, the third elector SEL3 is a selector for selecting the clock signal CK5 or CK7 in accordance with the clock selection timing adjustment signal SLC2 received from the clock selection timing adjustment circuit 1213 employed in the skew determination circuit 121 and supplying the selected one of the clock signals CK5 and CK7 to the second selector SEL2.

In the same way, the second elector SEL2 is a selector for selecting the clock signal CK received from the first selector SEL1 or the clock signal CK received from the third elector SEL3 in accordance with the clock selection timing adjustment signal SLC4 received from the clock selection timing adjustment circuit 1213 employed in the skew determination circuit 121 and supplying the selected clock signal CK to the flip-flop FF11. As described above, the clock signal CK received from the first selector SEL1 is the clock signal CK1 or CK3 whereas the clock signal CK received from the third selector SEL3 is the clock signal CK5 or CK7.

The second selector section 1222 is a component for selecting a clock signal CK from typically the clock signals CK5 and CK7 as a clock signal with a phase having a timing margin with respect to the phase of the recorded data WDT latched in the flip-flop FF11 in accordance with the clock selection timing adjustment signal SLC3 received from the clock selection timing adjustment circuit 1213 employed in the skew determination circuit 121 and for supplying the selected clock signal CK to the flip-flop FF12.

As is obvious from the above description, the flip-flop FF11 is used for latching the received recorded data WDT with a timing according to a clock signal CK selected by the first selector section 1221 from the clock signals CK1, CK3, CK5 and CK7 as a clock signal CK with a phase having a timing margin with respect to the phase of the recorded data WDT.

Also as is obvious from the above description, the flip-flop FF12 is used for latching the recorded data WDT, which has been latched in the flip-flop FF11, with a timing according to a clock signal CK selected by the second selector section 1222 from the clock signals CK5 and CK7 as a clock signal CK with a phase having a timing margin with respect to the phase of the recorded data WDT latched in the flip-flop FF11.

The flip-flop FF13 is used for latching the recorded data WDT, which has been latched in the flip-flop FF12, with a timing according to the clock signal CK4 having a phase approximately in the middle of the phases of the clock signals CK0 to CK7 generated by the PLL circuit 110 to serve as clock signals CK with phases different from each other.

The flip-flop FF14 is used for latching the recorded data WDT, which has been latched in the flip-flop FF13, with a timing according to the clock signal CK0 having a phase coinciding with the phase of the recording clock signal WCK supplied to the date determination circuit 130.

Next, processing performed in the configurations described above is explained by focusing on operations carried out by the data latching section 120.

The recording clock signal WCK is supplied to the PLL circuit 110 which then generates the 8 clock signals CK0 to CK7 with phases different from each other in synchronization with the phase of the recording clock signal WCK.

Each of the internal circuits employed in the recording compensation circuit 100 operates in accordance with the 8 clock signals CK0 to CK7.

Recorded data WDT supplied to the data latching section 120 is latched in the data latching circuit 122 with a timing according to a data latching clock signal, which is selected in accordance with the present embodiment, as a data signal synchronized with the data latching clock signal.

As described before, the 8 clock signals CK0 to CK7 generated by the PLL circuit 110 with phases different from each other are supplied to the data latching section 120. To put it in detail, the PLL circuit 110 generates the 8 clock signals CK0 to CK7 having phases different from each other with the phase of the clock signal CK0 synchronized with the phase of the recording clock signal WCK supplied to the PLL circuit 110.

The clock signals CK0, CK2, CK4 and CK6 are selected among the 8 clock signals CK0 to CK7 having phases different from each other and supplied to the skew determination circuit 121. Each of the clock signals CK1, CK5 and CK7 are supplied to the clock selection timing adjustment circuit 1213 to serve as clock signals CK for adjusting the timings of the clock select signal <0> and the clock select signal <1>.

On the other hand, the clock signals CK1, CK3, CK5 and CK7 are selected among the 8 clock signals CK0 to CK7 having phases different from each other and supplied to the data latching circuit 122 to serve as data latching clock signals providing timings each use for latching the recorded data WDT.

Operations (1) of the Skew Determination Circuit

Figure 7:
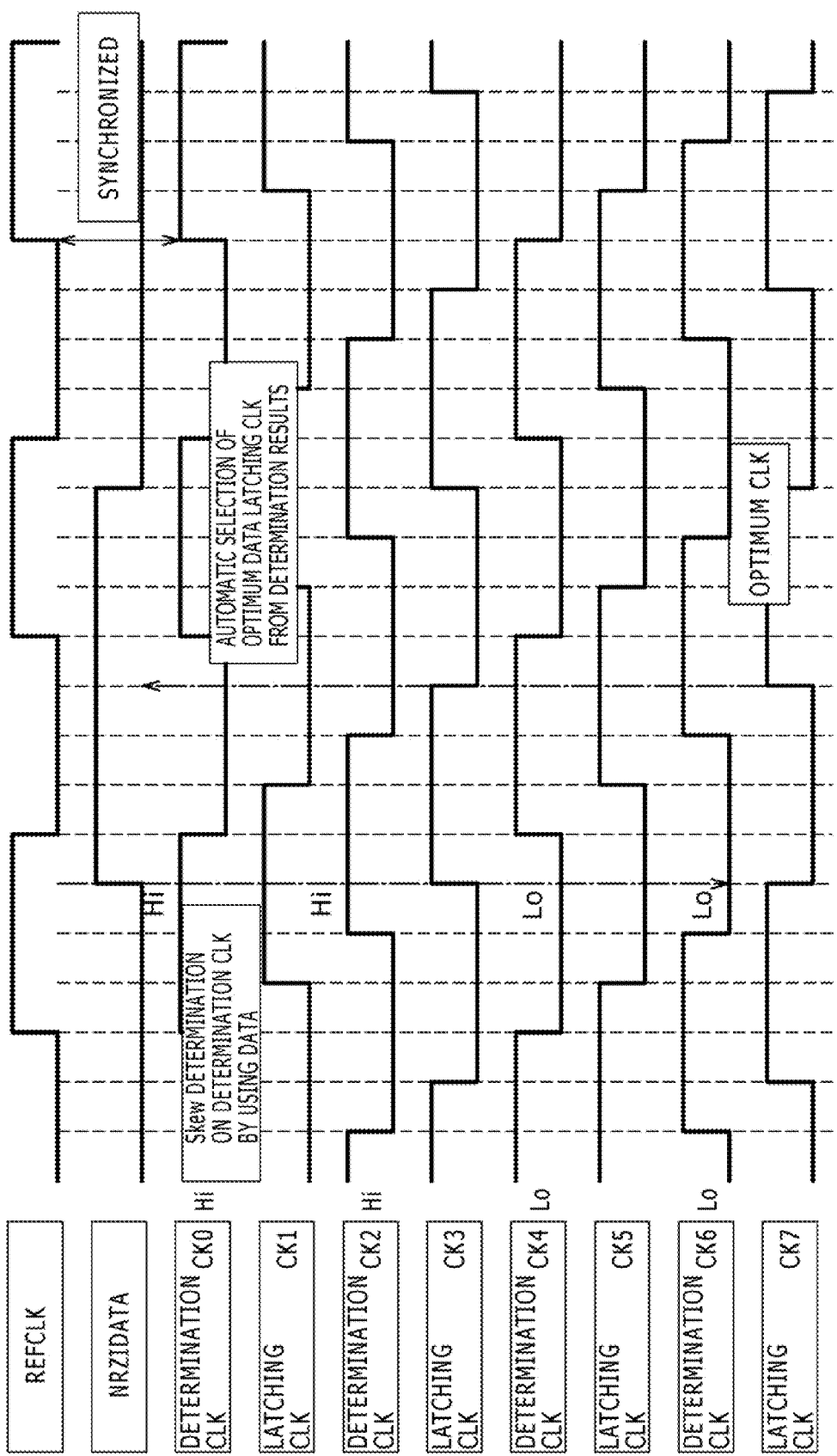
FIG. 7 shows timing charts of typical operations carried out by the skew determination circuit 121 to determine a clock signal having a phase optimum for an operation to latch recorded data.

By referring to diagrams of FIGS. 6 and 7, the following description explains operations carried out by the skew determination circuit 121 according to the embodiment to determine a clock signal CK having a phase optimum for latching the recorded data WDT.

FIG. 6 is a diagram showing a table referred to in description of typical operations carried out by the data latching phase determination circuit 1211 employed in the skew determination circuit 121 according to the embodiment to determine a clock signal CK having a phase optimum for an operation to latch recorded data WDT whereas FIG. 7 shows timing charts of typical operations carried out by the skew determination circuit 121 according to the embodiment to determine a clock signal CK having a phase optimum for an operation to latch recorded data WDT.

The skew determination circuit 121 latches the clock signals CK0, CK2, CK4 and CK6 in the flip-flops FF0, FF2, FF4 and FF6 respectively with a timing according to the recorded data WDT. The values of the latched clock signals CK0, CK2, CK4 and CK6 are then supplied to the data latching phase determination circuit 1211.

The data latching phase determination circuit 1211 determines a clock signal CK, that has a phase optimum for an operation to latch the recorded data WDT, on the basis of a combination of the values of the latched clock signals CK0, CK2, CK4 and CK6 in accordance with logic described in the table shown in FIG. 6.

In the typical example shown in the table of FIG. 6, a combination of a Hi latched value of the clock signal CK0, a Low latched value of the clock signal CK2, a Low latched value of the clock signal CK4 and a Hi latched value of the clock signal CK6 leads to selection of the clock signal CK5 as a clock signal CK that has a phase optimum for an operation to latch the recorded data WDT. In this case, the NRZI phase is <1>.

In the same example shown in the table of FIG. 6, a combination of a Hi latched value of the clock signal CK0, a Hi latched value of the clock signal CK2, a Low latched value of the clock signal CK4 and a Low latched value of the clock signal CK6 leads to selection of the clock signal CK7 as a clock signal CK that has a phase optimum for an operation to latch the recorded data WDT. In this case, the NRZI phase is <2>.

In the same example shown in the table of FIG. 6, a combination of a Low latched value of the clock signal CK0, a Hi latched value of the clock signal CK2, a Hi latched value of the clock signal CK4 and a Low latched value of the clock signal CK6 leads to selection of the clock signal CK1 as a clock signal CK that has a phase optimum for an operation to latch the recorded data WDT. In this case, the NRZI phase is <3>.

In the same example shown in the table of FIG. 6, a combination of a Low latched value of the clock signal CK0, a Low latched value of the clock signal CK2, a Hi latched value of the clock signal CK4 and a Hi latched value of the clock signal CK6 leads to selection of the clock signal CK3 as a clock signal CK that has a phase optimum for an operation to latch the recorded data WDT. In this case, the NRZI phase is <4>.

FIG. 7 shows timing charts for a case in which the data latching phase determination circuit 1211 selects the clock signal CK7 as a clock signal CK that has a phase optimum for an operation to latch the recorded data WDT in accordance with the logic shown in the table of FIG. 6.

It is to be noted that, in the operation carried out by the data latching phase determination circuit 1211 to select a clock signal CK that has a phase optimum for an operation to latch the recorded data WDT, the clock signal CK having an optimum phase is determined after verifying that the same value has been consecutively obtained a plurality of times (such as 3 times) in a row as a result of an operation to latch each of the clock signals CK0, CK2, CK4 and CK6. Thus, even if the phase optimum for an operation to latch the recorded data WDT is in the middle of the phases of 2 clock signals CK, no operation is carried out frequently to switch the phase optimum for an operation to latch the recorded data WDT from the phase of one of the 2 clock signals CK to the phase of the other clock signal CK and vice versa.

In addition, even for an abrupt noise, it is possible to make an incorrect operation hard to carry out.

Operations (2) of the Skew Determination Circuit

By referring to diagrams of FIGS. 8 to 12, the following description explains, among others, operations carried out by the clock selection timing adjustment circuit 1213 employed in the skew determination circuit 121 and the clock selection range of each selector SEL employed in the data latching circuit 122.

Figure 8:
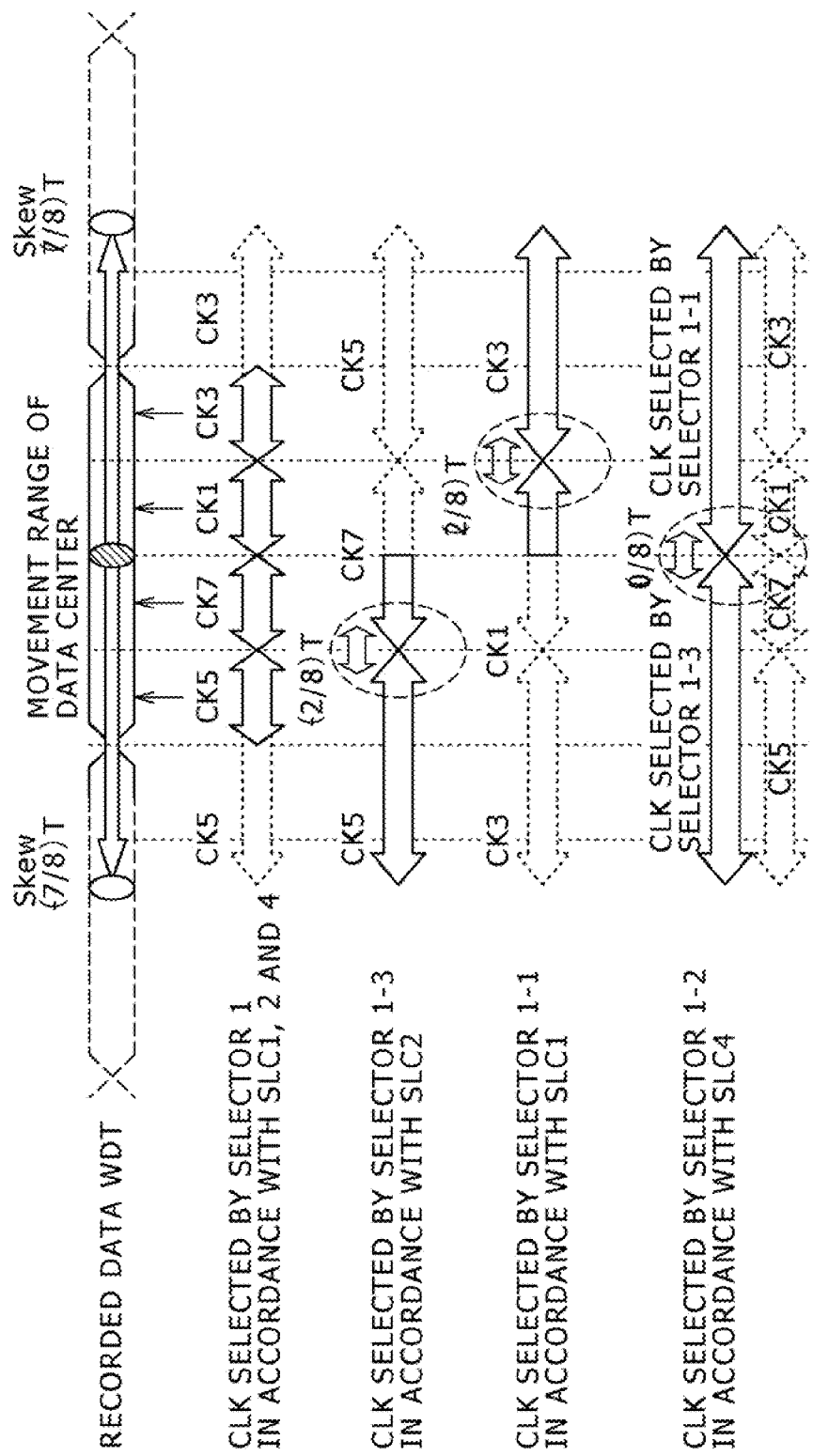
FIG. 8 is a diagram showing a clock selection range of a first selector section of a data latching circuit employed in the data latching section with respect to the center of the recorded data.

FIG. 8 is a diagram showing a clock selection range of a first selector section 1221 (referred to as selector 1 shown in a diagram of FIG. 9) employed in the data latching circuit 122 with respect to the center of the recorded data WDT. FIG. 9 is a diagram showing clock selection paths of selector 1.

Each of FIGS. 10A and 10B are timing diagrams each showing timing charts of an operation to select a clock signal CK with a phase optimum for an operation to latch recorded data WDT. To be more specific, FIG. 10A shows timing charts for a transition of a clock signal CK having a phase optimum for an operation to latch recorded data WDT from a clock signal CK having a leading phase to a clock signal CK having a lagging phase whereas FIG. 10B shows timing charts for a transition of a clock signal CK having a phase optimum for an operation to latch recorded data WDT from a clock signal CK having a lagging phase to a clock signal CK having a leading phase.

FIG. 11 is an explanatory diagram showing a table referred to in describing adjustment of timings of the clock select signals <0> and <1>.

Figure 12A:
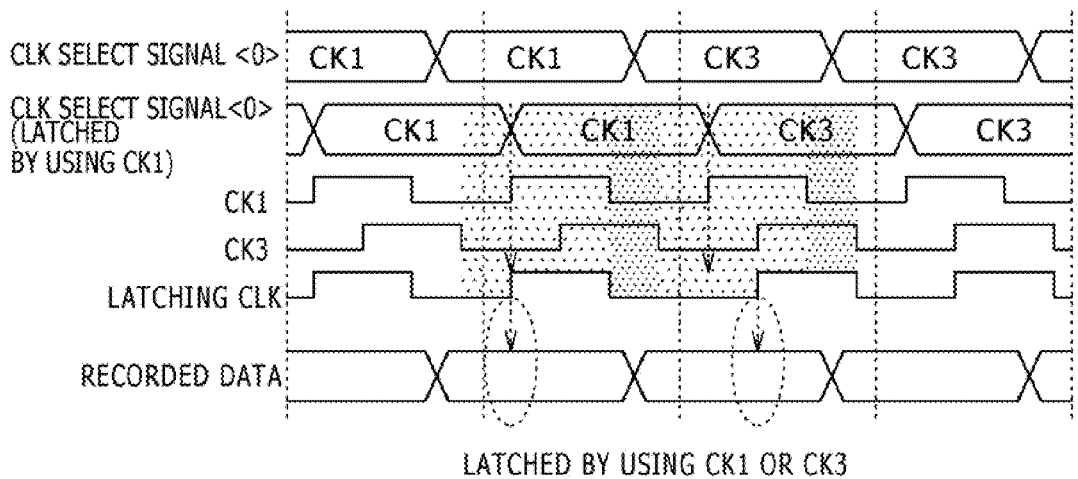
FIGS. 12A and 12B are timing diagrams each showing timing charts of clock selection transition states.
Figure 12B:
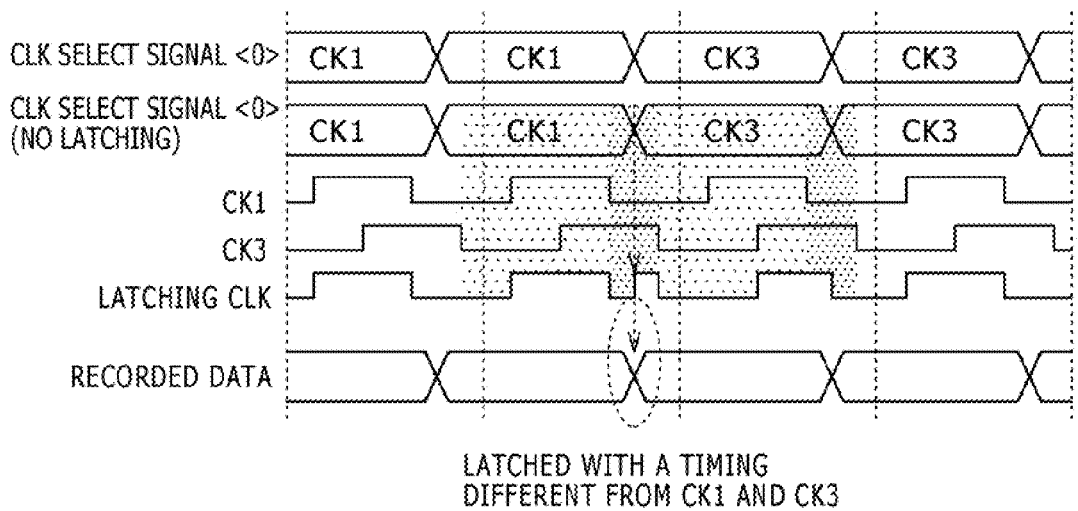

Each of FIGS. 12A and 12B shows timing charts of clock selection transition states. To be more specific, FIG. 12A shows timing charts for a case with latching of a clock select signal whereas FIG. 12B shows timing charts for a case without latching of a clock select signal.

As shown in the diagram of FIG. 8, the clock signal selected by the 4 selector SEL3, SEL2, SEL1 or SELECTOR2 employed in the data latching circuit 122 is changed when the skew exceeds −2/8 T, 0/8 T or 2/8 T respectively. It is to be noted that, in the block diagram of FIG. 5 or FIG. 9, the selectors SEL1, SEL2, SEL3 and SEL4 are referred to as selectors 1-1, 1-2, 1-3 and 2 respectively.

On one side with respect to the data center of the recorded data WDT (that is, on the right-hand side of the diagram of FIG. 8), the clock selection timing adjustment signal SLC1 drives the selector SEL1 (or selector 1-1 in the timing charts shown in FIG. 8) to select the clock signal CK1 or CK3 as a data latching clock signal. Then, when the skew exceeds 2/8 T, the selected data latching clock signal is changed.

On the other side with respect to the data center of the recorded data WDT (that is, on the left-hand side of the diagram of FIG. 8), on the other hand, the clock selection timing adjustment signal SLC2 drives the selector SEL3 (or selector 1-3 in the timing charts shown in FIG. 8) to select the clock signal CK5 or CK7 as a data latching clock signal. Then, when the skew exceeds −2/8 T, the selected data latching clock signal is changed.

In addition, at the data center of the recorded data WDT, a clock signal CK having a phase optimum for an operation to latch the recorded data WDT is selected by the selector SEL2 (or selector 1-2 in the timing charts shown in FIG. 8) in accordance with the clock selection timing adjustment signal SLC4 from the data latching clock signal CK1 or CK3 selected by the selector SEL1 in accordance with the clock selection timing adjustment signal SLC1 and the data latching clock signal CK5 or CK7 selected by the selector SEL3 in accordance with the clock selection timing adjustment signal SLC2. Then, when the skew exceeds 0/8 T, that is, for a position not coinciding with the data center of the recorded data WDT, the selected clock signal CK having a phase optimum for an operation to latch the recorded data WDT is changed to the data latching clock signal CK1 or CK3 selected by the selector SEL1 if the position is on the right-hand side of the diagram of FIG. 8 or the selected clock signal CK having a phase optimum for an operation to latch the recorded data WDT is changed to the data latching clock signal CK5 or CK7 selected by the selector SEL3 if the position is on the left-hand side of the diagram of FIG. 8.

In addition, as shown in the timing charts of FIGS. 10A and 10B, in order to continue the selection of a clock signal CK having a phase optimum for an operation to latch the recorded data WDT in the event of a skew variation occurring in the course of an operation, it is necessary to latch the recorded data WDT without generating an error also when the selected clock signal CK having a phase optimum for an operation to latch the recorded data WDT is changed.

If the selected clock signal CK having a phase optimum for an operation to latch the recorded data WDT is changed with a timing in a period between the falling edge of a pulse of a clock signal CK having a leading phase and the rising edge of a pulse of a clock signal CK having a lagging phase in an operation to change the clock signal CK having a phase optimum for an operation to latch the recorded data WDT from the clock signal CK having a leading phase to the clock signal CK having a lagging phase, however, a rising edge (or a data latching edge) is generated undesirably with a timing different from the clock signal CK having a phase optimum for an operation to latch the recorded data WDT before or after the change of the selected clock signal CK having a phase optimum for an operation to latch the recorded data WDT.

In order to solve the above problem, in this embodiment, by latching the CLK select signal <0:1> with a timing according to a clock signal CK selected from 2 clock signals CK supplied to each of the selectors 1-1, 1-2, 1-3 and 2 employed in the data latching circuit 122 as a clock signal CK having a leading one of the phases of the 2 clock signals as shown in the table of FIG. 11, the selected clock signal CK having a phase optimum for an operation to latch the recorded data WDT can be changed with a timing not in the period between the falling edge of a pulse of a clock signal CK having a leading phase and the rising edge of a pulse of a clock signal CK having a lagging phase in an operation to change the clock signal CK having a phase optimum for an operation to latch recorded data WDT from the clock signal CK having a leading phase to the clock signal CK having a lagging phase.

FIG. 12 is a diagram showing timing charts in a transition made by the selector 1-1 (also referred to as the selector SEL1) from the clock signal CK1 to the clock signal CK3.

The clock signal CK selected by the selector SEL1 is supplied to the selector 1-2 (also referred to as the selector SEL2).

By changing the clock signal CK selected by the selector SEL1 from the clock signal CK1 to the clock signal CK3 or vice versa with a timing according to the clock select signal <0> latched in the flip-flop FF1 with a timing according to the signal clock CK1, the recorded data WDT can be latched with a timing according to the clock signal CK1 or the clock signal CK3.

Data Latching Operations

By referring to diagrams of FIGS. 13 to 16, the following description explains operations carried out by the data latching circuit 122 to latch the recorded data WDT and explains a skew adjustment range.

Figure 13A:
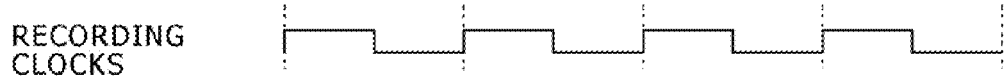
FIGS. 13A to 13E are timing diagrams each showing timing charts for a variety of skews.
Figure 13B:
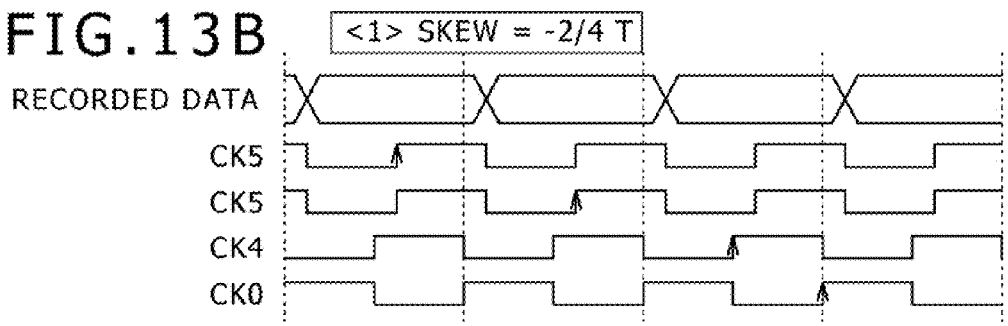
Figure 13C:
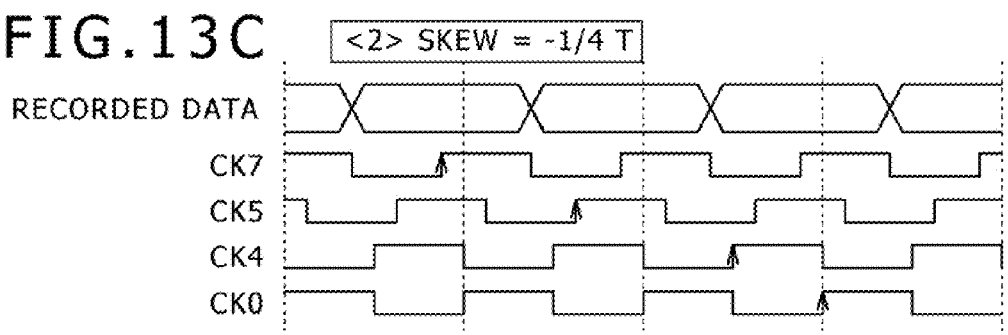
Figure 13D:
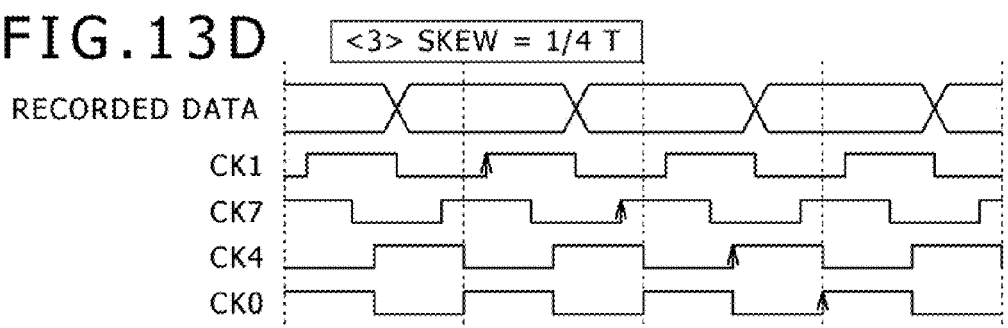
Figure 13E:
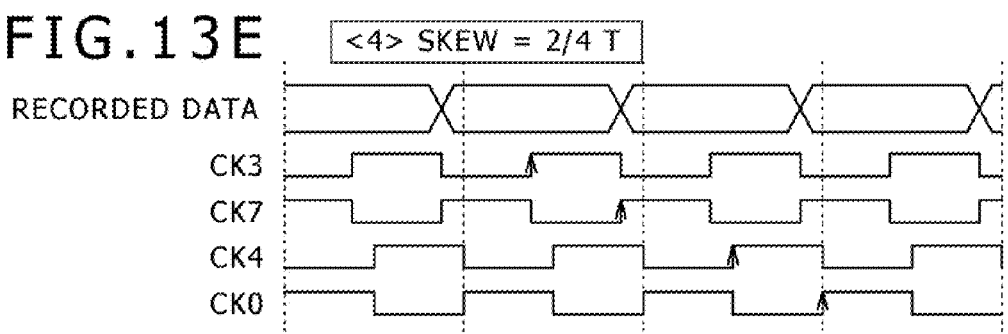

Each of FIGS. 13A to 13E shows timing charts for a variety of skews. To be more specific, FIG. 13A shows the timing chart of the recording clock signal WCK. FIG. 13B shows a variety of clock signals CK for a skew of −2/4 T whereas FIG. 13C shows a variety of clock signals CK for a skew of −1/4 T. FIG. 13D shows a variety of clock signals CK for a skew of 1/4 T whereas FIG. 13E shows a variety of clock signals CK for a skew of 2/4 T.

Figure 14A:
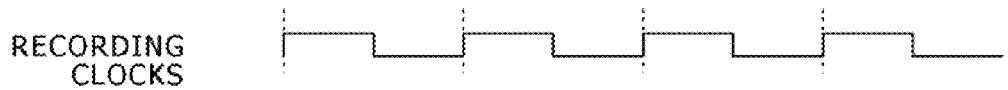
FIGS. 14A to 14C are timing diagrams each showing timing charts of signals generated in the event of a typical failure occurring in an operation to latch recorded data.
Figure 14B:
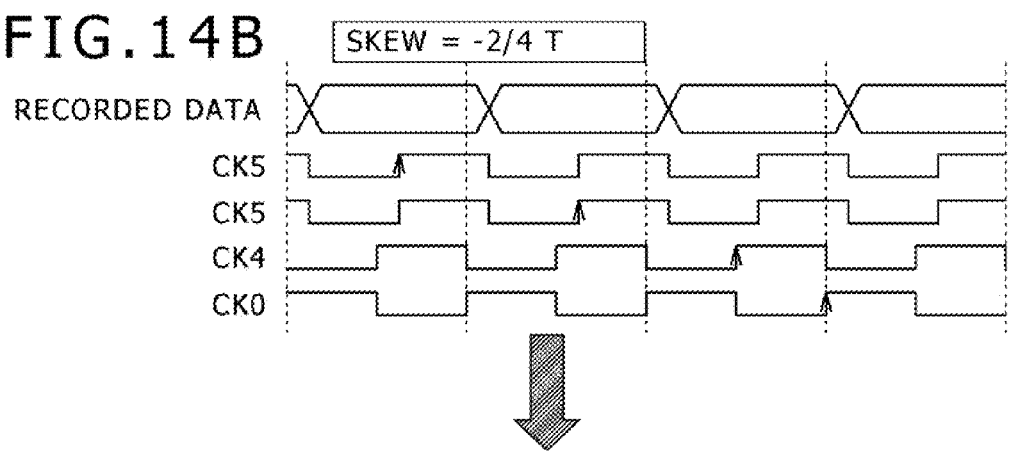
Figure 14C:
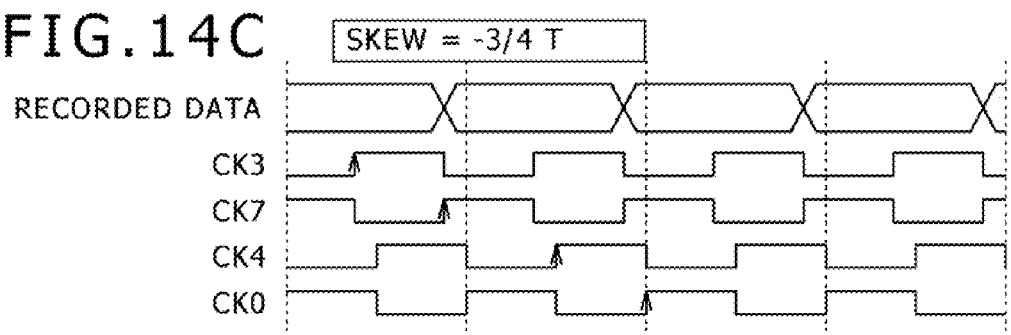

Each of FIGS. 14A to 14C shows timing charts of signals generated in the event of a typical failure occurring in an operation to latch recorded data WDT. To be more specific, FIG. 14A shows the timing chart of the recording clock signal WCK. FIG. 14B shows a variety of clock signals CK for a skew of −2/4 T whereas FIG. 14C shows a variety of clock signals CK for a skew of −3/4 T.

Each of FIGS. 15A to 15D is an explanatory diagram referred to in description of enlargement of a skew adjustment range. To be more specific, FIG. 15A shows the timing chart of the recording clock signal WCK whereas FIG. 15B shows the recorded data WDT for a variety of skews. FIG. 15C shows the timing chart of the clock signal CK0 generated by the PLL circuit 110 whereas FIG. 15D shows timings according to the clock signals CK1, CK3, CK5 and CK7.

FIG. 16 is a diagram showing transitions of the state of the data latching phase determination circuit 1211.

As described above, the data latching circuit 122 employs the flip-flops FF11, FF12, FF13 and FF14 which are connected in series to form a 4-stage latch.

In the first selector section 1221 employed in the data latching circuit 122, in accordance with the clock selection timing adjustment signals SLC1, SLC2 and SLC3 generated by the skew determination circuit 121 as a result of the determination of a phase optimum for an operation to latch the recorded data WDT and a result of the selection of a clock select signal <0> or <1>, the phase of a clock signal CK used for latching recorded data WDT is selected from the phases of the data latching clock signals CK1, CK3, CK5 and CK7. Then, the recorded data WDT is latched in the flip-flop FF11 serving as the first stage of the 4-stage latch with a timing according to a data latching clock signal CK, the phase of which has been selected by the first selector section 1221.

Later on, as shown in the timing charts of FIGS. 13A to 13E, the recorded data WDT latched in the flip-flop FF11 is latched in the flip-flop FF12 serving as the second stage of the 4-stage latch with a timing according to the data latching clock signal CK5 or CK7 and, then, the recorded data WDT latched in the flip-flop FF12 is latched in the flip-flop FF13 serving as the third stage of the 4-stage latch with a timing according to the data latching clock signal CK4. Finally, the recorded data WDT latched in the flip-flop FF13 is latched in the flip-flop FF14 serving as the fourth stage of the 4-stage latch with a timing according to the data latching clock signal CK0. Thus, the recorded data WDT can be latched with a timing according to the same phase as the recording clock signal WCK.

By latching the recorded data WDT sequentially at the successive stages of the 4-stage latch in accordance with the data latching procedure described above, the recorded data can be output from the data latching circuit 122 to the data determination circuit 130 with a timing corresponding to a fixed phase even if the data latching phase changes in the course of the operation.

Operations (3) of the Skew Determination Circuit

The data latching circuit 122 carries out the data latching procedure in which, after the recorded data WDT has been latched sequentially at the successive first to third stages of the 4-stage latch with the timings each according to the phase of a selected data latching clock signal CK, the recorded data WDT is again latched at the fourth stage of the 4-stage latch with a timing according to the clock signal CK0 having the same phase as the recording clock signal WCK supplied to the PLL circuit 110. Thus, as shown in the timing charts of FIGS. 13A to 13E, in the ±1/2 T range of skews of the recorded data WDT with respect to the recording clock signal WCK supplied to the PLL circuit 110, the data latching circuit 122 is capable of outputting correct recorded data WDT to the data determination circuit 130 with a timing synchronized to the recording clock signal WCK even if the data latching phase changes in the course of the operation.

With this configuration sustained as it is, however, as shown in the timing charts of FIGS. 14A to 14C, if the skew changes to, for example, −3/4 T exceeding ±1/2 T, the phase for latching the recorded data WDT is undesirably shifted by 1 clock so that the recorded data WDT can no longer be latched correctly.

In order to solve the problem described above, in this embodiment, a countermeasure is taken as shown in the explanatory diagrams of FIGS. 15A to 15D.

The data latching phase determination circuit 1211 employed in the skew determination circuit 121 is capable of knowing the skew of the recorded data WDT as a skew relative to the supplied recording clock signal WCK on the basis of the determined phase optimum for an operation to latch the recorded data WDT.

When the skew is about to go beyond a state of ±1/2 T, a function to hold the immediately preceding phase optimum for an operation to latch the recorded data WDT is carried out.

Thus, by carrying out such a function, the recorded data WDT can be latched correctly without shifting the phase for latching the recorded data WDT even if the skew goes beyond the state of ±1/2 T.

By selecting a clock signal CK having a phase optimum for an operation to latch the recorded data WDT from the 4 clock signals as described above, it is possible to cope with skews up to maximum values of ±7/8 T as shown in the diagram of FIG. 15B.

In addition, by adding the number of 4 clock signals CK from which a clock signal CK having a phase optimum for an operation to latch the recorded data WDT is selected, it is possible to provide a skew adjustment range smaller than maximum values of ±1 T.

In the typical example shown in the diagram of FIG. 15B, in order to increase the skew adjustment range of skews between the recording clock signal WCK used as a reference clock signal and the recorded data WDT, if the skew exceeds the range −2/4 T to 2/4 T shown in sub-diagrams <2> to <5> of the diagram of FIG. 15B, the clock signal CLK is held as shown in sub-diagrams <1> and <6> of the diagram of FIG. 15B.

Thus, it is possible to prevent the clock signal CLK from being shifted by a distance equal to 1 period or a longer distance and, by fixing the so-called pipeline delay, the skew adjustment range can be increased to the range −7/8 T to +7/8 T as shown in the sub-diagrams <1> to <6> of the diagram of FIG. 15B.

The processing carried out by the data latching phase determination circuit 1211 can be carried out by referring to the state transition diagram of FIG. 16 as follows.

A transition from the clock signal CK1 corresponding to a skew of 1/4 T to the clock signal CK3 corresponding to a skew of 2/4 T or from the clock signal CK3 to the clock signal CK1 occurs in accordance with conditions shown in the table of FIG. 6.

By the same token, a transition from the clock signal CK7 corresponding to a skew of −1/4 T to the clock signal CK5 corresponding to a skew of −2/4 T or from the clock signal CK5 to the clock signal CK7 occurs in accordance with conditions shown in the table of FIG. 6.

In the same way, a transition from the clock signal CK1 corresponding to a skew of 1/4 T to the clock signal CK7 corresponding to a skew of −1/4 T or from the clock signal CK7 to the clock signal CK1 occurs in accordance with conditions shown in the table of FIG. 6.

A transition from the clock signal CK3 corresponding to a skew of 2/4 T to the clock signal CK7 corresponding to a skew of −1/4 T cannot occur.

By the same token, a transition from the clock signal CK5 corresponding to a skew of −2/4 T to the clock signal CK1 corresponding to a skew of 1/4 T cannot occur.

A transition from the clock signal CK3 corresponding to a skew of 2/4 T to the clock signal CK5 corresponding to a skew of −2/4 T or from the clock signal CK5 to the clock signal CK3 cannot occur.

The recorded data WDT latched in the data latching circuit 122 employed in the data latching section 120 is supplied to the data determination circuit 130 provided at a stage following the data latching section 120. The data determination circuit 130 carries out a mark-length determination process and a space-length determination process on the recorded data WDT received from the data latching circuit 122 in order to generate a mark length and a space length.

The light emission timing data RAM 140 is used for storing light-emission timing information, which is associated with each mark length and each space length, in advance. A timing generation circuit 150 receives the information on light emission timings as information associated with the mark and space lengths, which have been generated by the data determination circuit 130, from the light emission timing data RAM 140.

The timing generation circuit 150 also receives a plurality of clock signals CK0 to CKn generated by the PLL circuit 110 as clock signals CK having phases different from each other. The timing generation circuit 150 selects a necessary light emission timing corresponding to one of the clock signals CK0 to CKn received from the PLL circuit 110 in accordance with the information, which is received from the light emission timing data RAM 140 as the information on light emission timings, and generates a light emission timing signal representing the selected light emission timing.

As described above, in accordance with the embodiment, the recording compensation circuit 100 employs: the PLL circuit 110 serving as a phase synchronization circuit for generating a plurality of clock signals CK0 to CK7 having phases different from each other to serve as clock signals CK synchronized with the recording clock signal WCK supplied to the PLL circuit 110; the skew determination circuit 121 for latching some of the clock signals CK0 to CK7, which are generated by the PLL circuit 110 as clock signals CK having phases different from each other, with a timing according to recorded data WDT supplied to the skew determination circuit 121 and for determining a phase optimum for an operation to latch the recorded data WDT on the basis of a combination of the values of the latched clock signals CK; and the data latching circuit 122 for latching the recorded data WDT supplied to the data latching circuit 122 by making use of a clock signal CK having a phase conforming to a result of determination carried out by the skew determination circuit 121.

The data latching circuit 122 selects a clock signal CK with a phase having a timing margin with respect to the phase of the recorded data WDT supplied to the data latching circuit 122 to serve as the clock signal CK which is used for latching the recorded data WDT. Thus, the following effects can be obtained.

The recorded data WDT supplied to the data latching circuit 122 can thus be latched with a timing according to a clock signal CK selected from the clock signals CK0 to CKn which are generated by the PLL circuit 110 as clock signals CK having phases different from each other. As a result, the recorded data WDT can be latched without generating an error even if there is a difference in phase between the recorded data WDT and the recording clock signal WCK.

In addition, the consecutive-times consistency determination circuit 1212 employed in the skew determination circuit 121 is provided with a function for verifying that the same value has been consecutively obtained a plurality of times in a row as a result of an operation to latch each of the clock signals CK0, CK2, CK4 and CK6, which are generated by the phase synchronization circuit 110 as clock signals having phases different from each other, in the flip-flop FF0, FF2, FF4 or FF6 respectively with a timing according to the recorded data WDT. Thus, an incorrect operation to select a clock signal CK with a phase optimum for an operation to latch the recorded data WDT is not carried out.

On the top of that, in accordance with the clock select signals <0> and <1> received from the consecutive-times consistency determination circuit 1212, the clock selection timing adjustment circuit 1213 employed in the skew determination circuit 121 changes any of the selected clock signals CK1, CK3, CK5 and CK7 each having a phase optimum for an operation to latch the recorded data WDT with a timing not in the period between the falling edge of a pulse of a clock signal CK having a leading phase and the rising edge of a pulse of a clock signal CK having a lagging phase in an operation to change the clock signal CK having a phase optimum for an operation to latch recorded data WDT from the clock signal CK having a leading phase to the clock signal CK having a lagging phase. The clock selection timing adjustment circuit 1213 generates clock selection timing adjustment signals SLC1 to SLC4 as a result of changing the clock signal CK having a phase optimum for an operation to latch recorded data WDT and outputs the clock selection timing adjustment signals SLC1 to SLC4 to the data latching circuit 122. Thus, effects described below can be obtained.

The skew is always detected and determined while an operation to record marks WMK onto the optical disk is being carried out. In addition, the selected clock signal CK having a phase optimum for an operation to latch the recorded data WDT is changed with a timing not in a period between the falling edge of a pulse of a clock signal CK having a leading phase and the rising edge of a pulse of a clock signal CK having a lagging phase in an operation to change the clock signal CK having a phase optimum for an operation to latch recorded data WDT from the clock signal CK having a leading phase to the clock signal CK having a lagging phase. Thus, even if the skew changes in the course of an operation to record marks WMK onto the optical disk, the selected clock CK is always a clock signal CK having a phase optimum for an operation to latch the recorded data WDT. As a result, the recorded data WDT can be latched without generating an error In addition, the data latching circuit 122 is provided with a function to again latch recorded data WDT with a timing according to the clock signal CK0 having the same phase as the recording clock signal WCK supplied to the PLL circuit 110 after latching the recorded data WDT with a timing according to a selected clock signal CK having a phase optimum for an operation to latch the recorded data WDT. Thus, even if the selected clock signal CK having a phase optimum for an operation to latch the recorded data WDT is changed in the course of an operation to record marks WMK onto the optical disk, the phase of each of the marks WMK recorded onto the optical disk does not change.

If the skew of the recorded data WDT with respect to the recording clock signal WCK exceeds ±1/2 T, the skew determination circuit 121 carries out a function to hold a phase immediately preceding the detection of the skew of the recorded data WDT exceeding ±1/2 T as a phase optimum for an operation to latch the recorded data WDT. Thus, the recorded data WDT can be latched without generating an error for skews in a range equal or greater than ±1/2 T but smaller than ±1 T.

It is to be noted that implementations of the present application are by no means limited to the embodiment described above. That is to say, the present embodiment can be changed in a variety of ways within a range not deviating from essentials of the present application.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A laser driving circuit employing a recording compensation circuit configured to generate a light emission timing of a laser on the basis of recorded data and a recording clock signal which are supplied to said recording compensation circuit comprising:
   a phase synchronization circuit configured to generate a plurality of clock signals having phases different from each other to serve as clock signals synchronized with said recording clock signal supplied to said phase synchronization circuit;
   a skew determination circuit configured to latch some of said clock signals, which are generated by said phase synchronization circuit as clock signals having phases different from each other, with a timing according to said recorded data supplied to said skew determination circuit and configured to determine a phase optimum for an operation to latch said recorded data on the basis of a combination of the values of said latched clock signals; and
   a data latching circuit configured to latch said recorded data supplied to said date latching circuit by making use of a clock signal having a phase conforming to a result of determination carried out by said skew determination circuit,
   wherein said data latching circuit selects a clock signal with a phase having a timing margin with respect to the phase of said recorded data supplied to said data latching circuit to serve as said clock signal which is used for latching said recorded data, and
   wherein said skew determination circuit has a consecutive-times consistency determination circuit configured to carry out a process of verifying that the same value has been consecutively obtained a plurality of times in a row as a result of an operation to latch each of said clock signals, which are generated by said phase synchronization circuit as clock signals having phases different from each other, with a timing according to said recorded data supplied to said skew determination circuit.

2. The laser driving circuit according to claim 1 wherein said skew determination circuit has a clock selection timing adjustment circuit configured to change a data latching clock signal used for latching said recorded data with a timing not in a period between the falling edge of a pulse of a clock signal having a leading phase and the rising edge of a pulse of a clock signal having a lagging phase in an operation to change said data latching clock signal from said clock signal having a leading phase to said clock signal having a lagging phase.

3. The laser driving circuit according to claim 2 wherein:
   said skew determination circuit is provided with a function for determining a skew of said recorded data with respect to said recording clock signal supplied to said phase synchronization circuit from a phase determined by said skew determination circuit to be said phase optimum for an operation to latch said recorded data; and
   if said function determines that said skew exceeds ±1/2 T, said skew determination circuit holds an optimum data latching phase immediately preceding detection of said skew, which exceeds ±1/2 T.

4. The laser driving circuit according to claim 1 wherein, after said data latching circuit latches said recorded data supplied to said data latching circuit by making use of a clock signal with a phase having a timing margin with respect to the phase of said recorded data, said data latching circuit again latches said recorded data with a timing synchronized to said recording clock signal supplied to said phase synchronization circuit.

5. A recording compensation method provided for a laser driving circuit configured to generate a light emission timing of a laser on the basis of recorded data and a recording clock signal which are supplied to said laser driving circuit, said recording compensation method comprising the steps of:
   generating a plurality of clock signals having phases different from each other to serve as clock signals synchronized with said recording clock signal supplied to said laser driving circuit;
   latching said clock signals, which are generated at said phase synchronization step as clock signals having phases different from each other, with a timing according to said recorded data supplied to said laser driving circuit and determining a phase optimum for an operation to latch said recorded data on the basis of a combination of said values of said latched clock signals; and
   latching said recorded data supplied to said laser driving circuit by making use of a clock signal having a phase conforming to a result of determination carried out at said skew determination step,
   wherein said data latching step is executed in order to select a clock signal with a phase having a timing margin with respect to the phase of said recorded data supplied to said laser driving circuit to serve as said clock signal which is used for latching said recorded data, and wherein said latching said clock signals step verifies that the same value has been consecutively obtained a plurality of times in a row as a result of an operation to latch each of said clock signals with a timing according to said recorded data.

6. An optical-disk apparatus configured to record recorded data onto an optical disk medium by making use of laser employing a recording compensation circuit configured to generate a light emission timing of said laser on the basis of recorded data and a recording clock signal which are supplied to said recording compensation circuit comprising:

a phase synchronization circuit configured to generate a plurality of clock signals having phases different from each other to serve as clock signals synchronized with said recording clock signal supplied to said phase synchronization circuit;

a skew determination circuit configured to latch some of said clock signals, which are generated by said phase synchronization circuit as clock signals having phases different from each other, with a timing according to said recorded data supplied to said skew determination circuit and configured to determine a phase optimum for an operation to latch said recorded data on the basis of a combination of the values of said latched clock signals; and a data latching circuit configured to latch said recorded data supplied to said date latching circuit by making use of a clock signal having a phase conforming to a result of determination carried out by said skew determination circuit, wherein said data latching circuit selects a clock signal with a phase having a timing margin with respect to the phase of said recorded data supplied to said data latching circuit to serve as said clock signal which is used for latching said recorded data, and wherein said skew determination circuit has a consecutive-times consistency determination circuit configured to carry out a process of verifying that the same value has been consecutively obtained a plurality of times in a row as a result of an operation to latch each of said clock signals, which are generated by said phase synchronization circuit as clock signals having phases different from each other, with a timing according to said recorded data supplied to said skew determination circuit.

7. The optical-disk apparatus according to claim 6 wherein said skew determination circuit has a clock selection timing adjustment circuit configured to change a data latching clock signal used for latching said recorded data with a timing not in a period between the falling edge of a pulse of a clock signal having a leading phase and the rising edge of a pulse of a clock signal having a lagging phase in an operation to change said data latching clock signal from said clock signal having a leading phase to said clock signal having a lagging phase.

8. The optical-disk apparatus according to claim 6 wherein, after said data latching circuit latches said recorded data supplied to said data latching circuit by making use of a clock signal with a phase having a timing margin with respect to the phase of said recorded data, said data latching circuit again latches said recorded data with a timing synchronized to said recording clock signal supplied to said phase synchronization circuit.

9. The optical-disk apparatus according to claim 7 wherein:

said skew determination circuit is provided with a function for determining a skew of said recorded data with respect to said recording clock signal supplied to said phase synchronization circuit from a phase determined by said skew determination circuit to be said phase optimum for an operation to latch said recorded data; and if said function determines that said skew exceeds ±1/2 T, said skew determination circuit holds an optimum data latching phase immediately preceding detection of said skew, which exceeds ±1/2 T.

* * * * *